（12) United States Patent
Si et al.

(10) Patent No.: US 11,316,645 B2
(45) Date of Patent: Apr. 26, 2022

(54) METHOD AND APPARATUS FOR RMSI RECEPTION FROM A NEIGHBORING CELL

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/947,402

(22) Filed: Jul. 30, 2020

(65) Prior Publication Data

US 2021/0067298 A1    Mar. 4, 2021

Related U.S. Application Data

(60) Provisional application No. 62/981,790, filed on Feb. 26, 2020, provisional application No. 62/948,555, (Continued)

(51) Int. Cl.
*H04L 5/00* (2006.01)
*H04W 48/12* (2009.01)
(Continued)

(52) U.S. Cl.
CPC .......... *H04L 5/0053* (2013.01); *H04L 5/0094* (2013.01); *H04W 48/12* (2013.01); *H04W 56/001* (2013.01); *H04W 72/042* (2013.01)

(58) Field of Classification Search
CPC ........ H04L 5/00; H04W 48/12; H04W 56/00; H04W 72/04
See application file for complete search history.

(56) References Cited

U.S. PATENT DOCUMENTS 10,791,550 B2   9/2020   Ko et al.
2019/0200307 A1   6/2019   Si et al.
(Continued)

FOREIGN PATENT DOCUMENTS

EP           3515123 A1    7/2019
KR    10-2019-0060747 A    6/2019

OTHER PUBLICATIONS

"3rd Generation Partnership Project; Technical Specification Group Radio Access Network; NR; Physical channels and modulation (Release 15)", 3GPP TS 38.211 V15.4.0, Dec. 2018, 96 pages.
(Continued)

*Primary Examiner* — Kyaw Z Soe

(57) ABSTRACT

A method and apparatus of a UE in a wireless communication system supporting a shared spectrum channel access is provided. The method and apparatus comprises: identifying a frequency location of a synchronization signals and physical broadcast channel (SS/PBCH) block; receiving the SS/PBCH block; determining whether the frequency location of the SS/PBCH block corresponds to a global synchronization channel number (GSCN) of a synchronization raster entry; and determining an offset as a sum of a first offset and a second offset, if the frequency location of the SS/PBCH block does not correspond to the GSCN of the synchronization raster entry, wherein the offset is a difference from a smallest resource block (RB) index of a control resource set (CORESET) for Type0 physical downlink control channel (Type0-PDCCH) common search space (CSS) set to a smallest RB index of a common RB overlapping with a first RB of the SS/PBCH block.

18 Claims, 14 Drawing Sheets

Related U.S. Application Data filed on Dec. 16, 2019, provisional application No. 62/944,019, filed on Dec. 5, 2019, provisional application No. 62/929,673, filed on Nov. 1, 2019, provisional application No. 62/903,098, filed on Sep. 20, 2019, provisional application No. 62/895,176, filed on Sep. 3, 2019, provisional application No. 62/893,224, filed on Aug. 29, 2019.

(51) Int. Cl.
*H04W 56/00* (2009.01)
*H04W 72/04* (2009.01)

(56) References Cited

U.S. PATENT DOCUMENTS

| | | | |
|---|---|---|---|
| 2019/0223163 A1* | 7/2019 | Ko | H04L 5/0048 |
| 2019/0253959 A1 | 8/2019 | Wei et al. | |
| 2021/0021363 A1* | 1/2021 | Lee | H04W 24/10 |

OTHER PUBLICATIONS

"3rd Generation Partnership Project; Technical Specification Group Radio Access Network; NR; Multiplexing and channel coding (Release 15)", 3GPP TS 38.212 V15.4.0, Dec. 2018, 100 pages.
"3rd Generation Partnership Project; Technical Specification Group Radio Access Network; NR; Physical layer procedures for control (Release 15)" 3GPP TS 38.213 V15.4.0, Dec. 2018, 104 pages.
"3rd Generation Partnership Project; Technical Specification Group Radio Access Network; NR; Physical layer procedures for data (Release 15)", 3GPP TS 38.214 V15.4.0, Dec. 2018, 102 pages.
"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.
Catt, "Summary of Remaining RMSI Issues," R1-1809854, 3GPP TSG RAN WG1 Meeting #94, Gothenburg, Sweden, Aug. 20-24, 2018, 7 pages.
LG Electronics, "Physical layer design of initial access signals and channels for NR-U," R1-1908532, 3GPP TSG RAN WG1 #98, Prague, CZ, Aug. 26-30, 2019, 17 pages.
Qualcomm Incorporated, "Initial access signals and channels for NR-U," R1-1909242, 3GPP TSG RAN WG1 Meeting #98, Prague, CZ, Aug. 26-30, 2019, 13 pages.
European Search Report dated Jan. 27, 2021 in connection with European Application No. 20193402.3, 9 pages.
International Search Report and the Written Opinion of the International Searching Authority dated Nov. 27, 2020 in connection with International Application No. PCT/KR2020/011556, 8 pages.

* cited by examiner

METHOD AND APPARATUS FOR RMSI RECEPTION FROM A NEIGHBORING CELL

CROSS-REFERENCE TO RELATED APPLICATIONS AND CLAIM OF PRIORITY

The present application claims priority to:
U.S. Provisional Patent Application Ser. No. 62/893,224, filed on Aug. 29, 2019;
U.S. Provisional Patent Application Ser. No. 62/895,176, filed on Sep. 3, 2019;
U.S. Provisional Patent Application Ser. No. 62/903,098, filed on Sep. 20, 2019;
U.S. Provisional Patent Application Ser. No. 62/929,673, filed on Nov. 1, 2019;
U.S. Provisional Patent Application Ser. No. 62/944,019, filed on Dec. 5, 2019;
U.S. Provisional Patent Application Ser. No. 62/948,555, filed on Dec. 16, 2019; and
U.S. Provisional Patent Application Ser. No. 62/981,790, filed on Feb. 26, 2020. The content of the above-identified patent document is incorporated herein by reference.

TECHNICAL FIELD

The present application relates generally to wireless communication systems, more specifically, the present disclosure relates to RMSI reception from neighboring cells.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for RMSI reception from neighboring cells.

In one embodiment, a user equipment (UE) in a wireless communication system supporting a shared spectrum channel access is provided. The UE comprises a processor configured to identify a frequency location of a synchronization signals and physical broadcast channel (SS/PBCH) block and a transceiver operably connected to the processor the transceiver configured to receive, from a base station (BS), the SS/PBCH block. The processor of the UE is further configured to: determine whether the frequency location of the SS/PBCH block corresponds to a global synchronization channel number (GSCN) of a synchronization raster entry, determine an offset as a sum of a first offset and a second offset, if the frequency location of the SS/PBCH block does not correspond to the GSCN of the synchronization raster entry, and the offset is a difference from a smallest resource block (RB) index of a control resource set (CORESET) for Type0 physical downlink control channel (Type0-PDCCH) common search space (CSS) set to a smallest RB index of a common RB overlapping with a first RB of the SS/PBCH block.

In another embodiment, a base station (BS) in a wireless communication system supporting a shared spectrum channel access is provided. The BS comprises a transceiver configured to transmit, to a user equipment (UE), a synchronization signals and physical broadcast channel (SS/PBCH) block, where in a frequency location of the SS/PBCH block is identified; whether the frequency location of the SS/PBCH block corresponds to a global synchronization channel number (GSCN) of a synchronization raster entry is determined; an offset as a sum of a first offset and a second offset is determined, if the frequency location of the SS/PBCH block does not correspond to the GSCN of the synchronization raster entry; and the offset is a difference from a smallest resource block (RB) index of a control resource set (CORESET) for Type0 physical downlink control channel (Type0-PDCCH) common search space (CSS) set to a smallest RB index of a common RB overlapping with a first RB of the SS/PBCH block.

In yet another embodiment, a method of a user equipment (UE) in a wireless communication system supporting a shared spectrum channel access is provided. The method comprises: identifying a frequency location of a synchronization signals and physical broadcast channel (SS/PBCH) block; receiving, from a base station (BS), the SS/PBCH block; determining whether the frequency location of the SS/PBCH block corresponds to a global synchronization channel number (GSCN) of a synchronization raster entry; and determining an offset as a sum of a first offset and a second offset, if the frequency location of the SS/PBCH block does not correspond to the GSCN of the synchronization raster entry, wherein the offset is a difference from a smallest resource block (RB) index of a control resource set (CORESET) for Type0 physical downlink control channel (Type0-PDCCH) common search space (CSS) set to a smallest RB index of a common RB overlapping with a first RB of the SS/PBCH block.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" and 3GPP TS 38.331 v15.4.0, "NR; Radio Resource Control (RRC) Protocol Specification."

Figure 1:
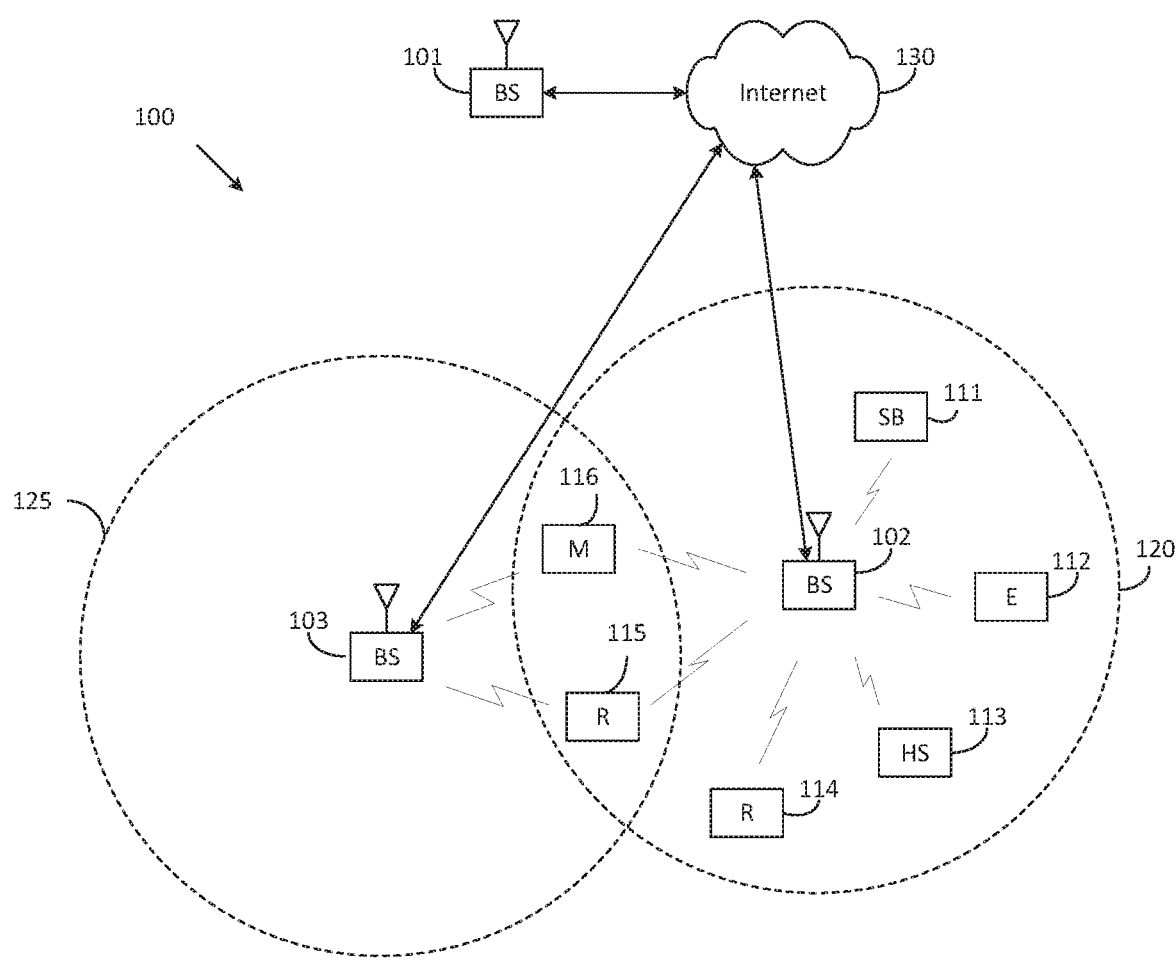
FIG. 1 illustrates an example wireless network according to embodiments of the present disclosure.
Figure 2:
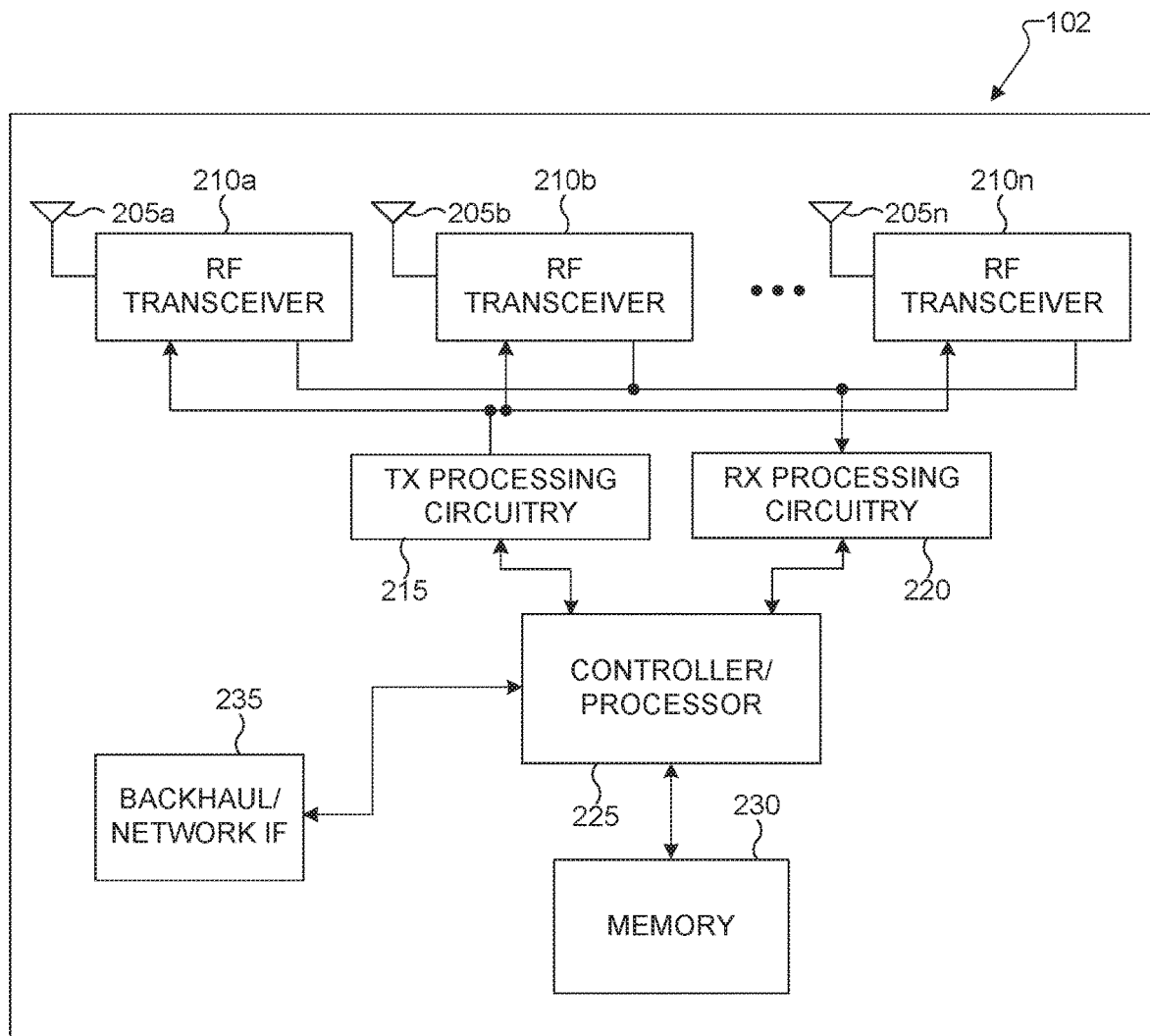
FIG. 2 illustrates an example gNB according to embodiments of the present disclosure.
Figure 3:
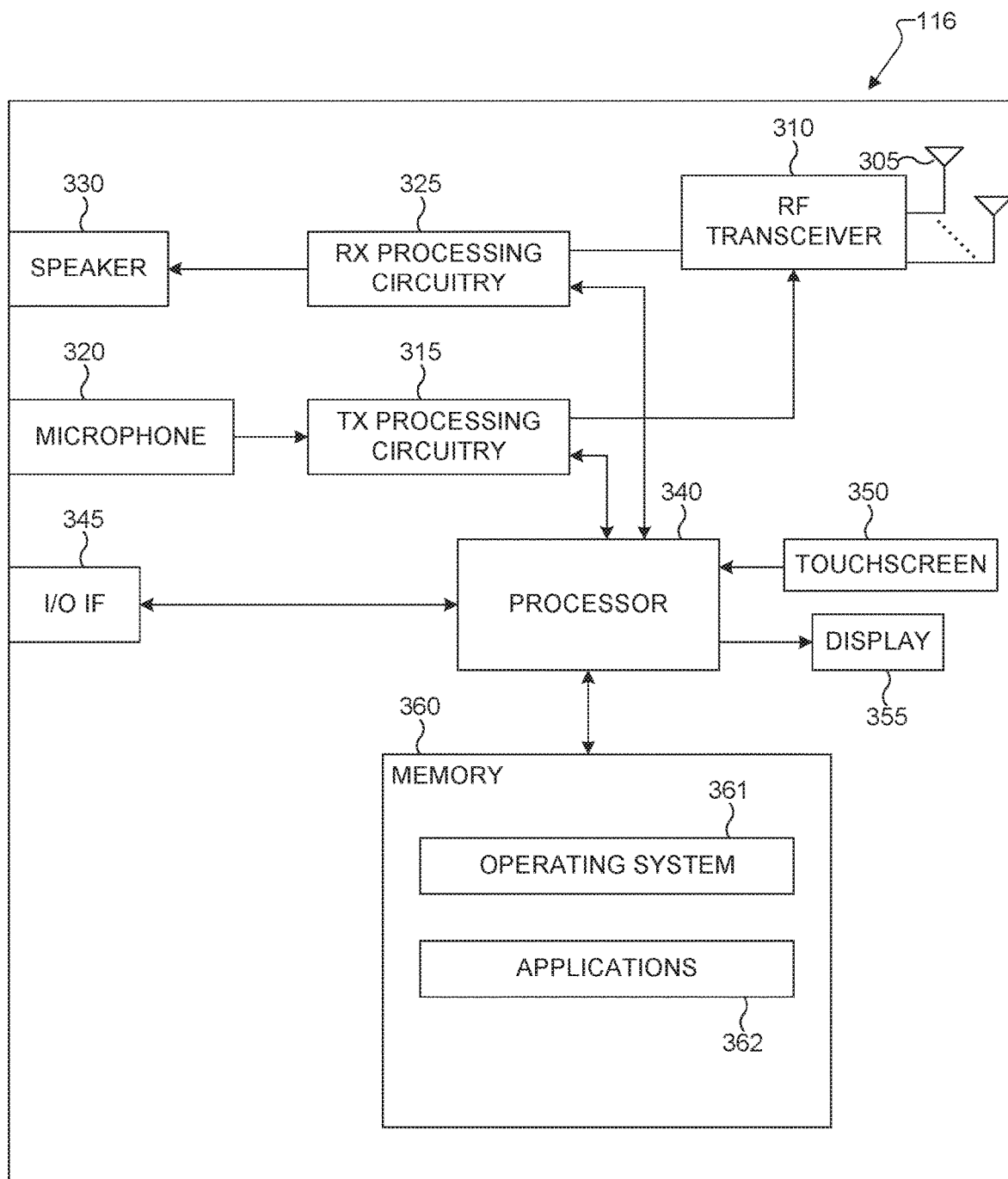
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programming, or a combination thereof, for efficient RMSI reception from neighboring cells.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
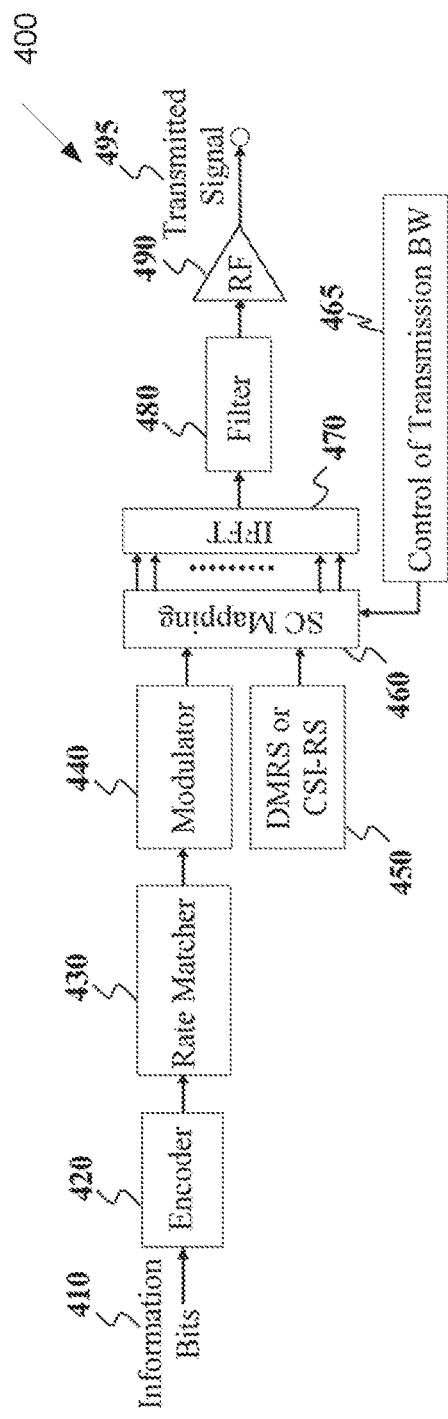
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
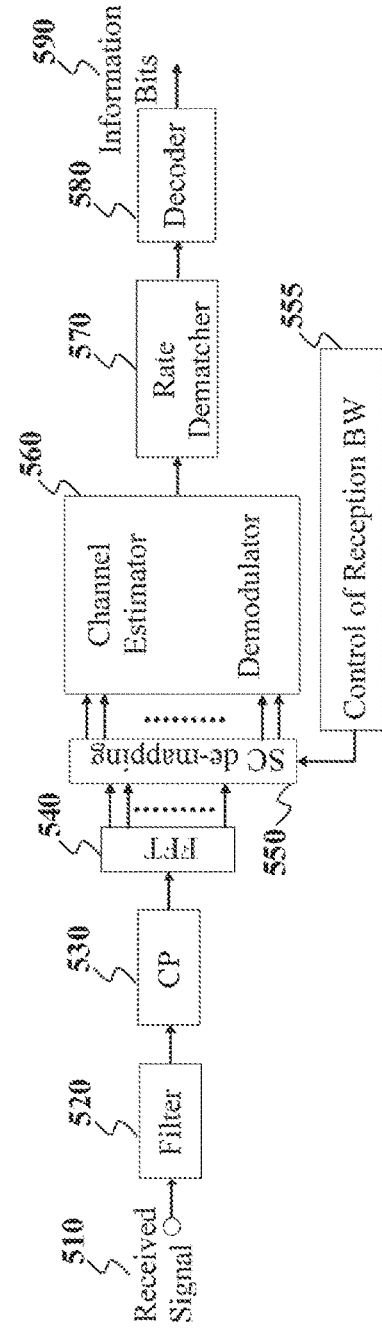
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
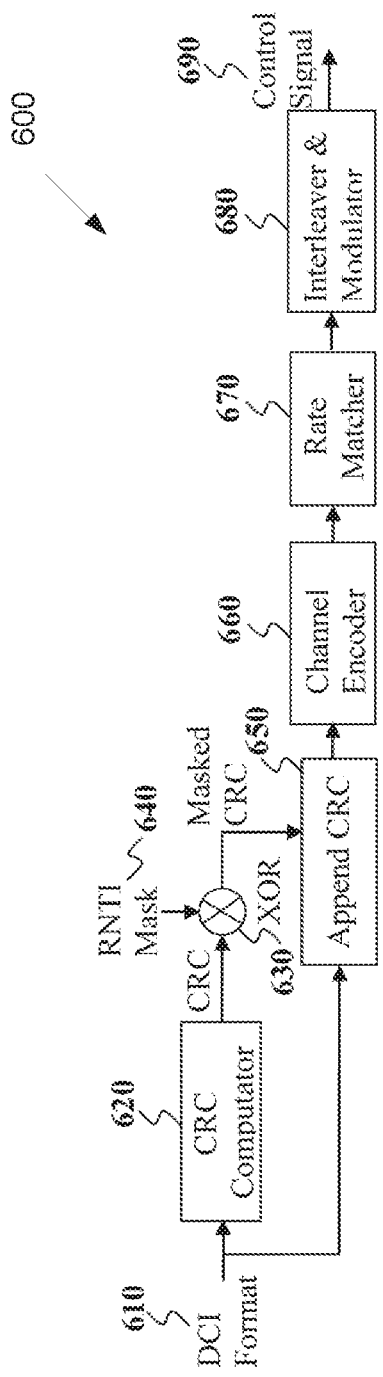
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
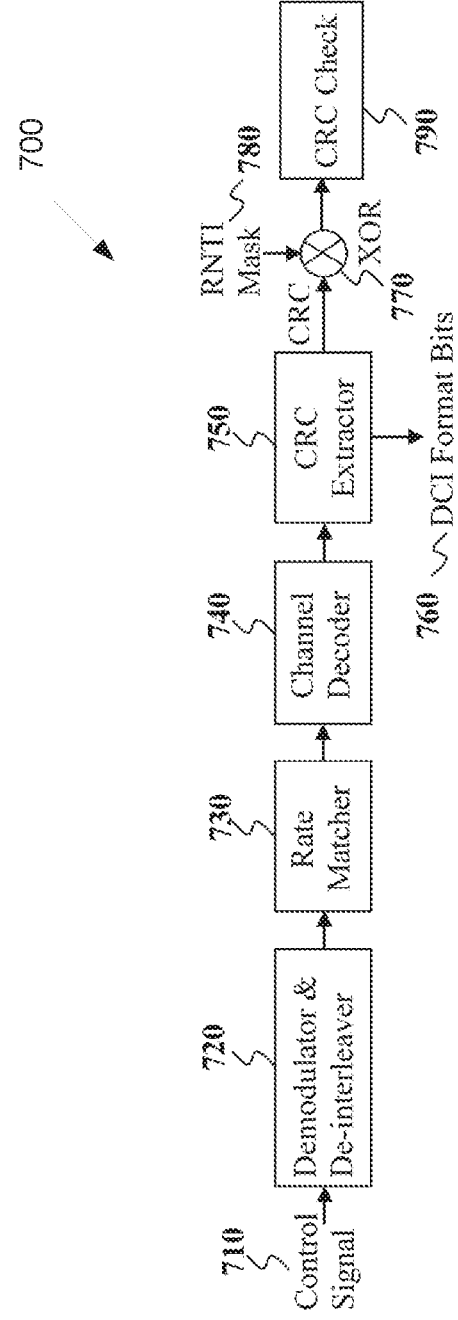
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

In new radio (NR) standard, remaining minimum system information (RMSI) is configured to be monitored by master system information (MIB) in a cell-defining synchronization signal and physical broadcast channel block (SS/PBCH block). A UE first acquire the frequency domain offset between the detected SS/PBCH block and control resource set (CORESET) #0 by reading the content of PBCH, wherein CORESET #0 contains the frequency domain resource for monitoring the physical downlink control channel (PDCCH) scheduling the RMSI.

The configuration of the frequency domain offset between the SS/PBCH block and CORESET #0 is designed based on the assumption that the SS/PBCH block is located on a synchronization raster entry, which implies the configuration of the offset between the SS/PBCH block and CORESET #0 may not be applicable to the SS/PBCH block which is not located on a synchronization raster entry in NR Rel-15.

In NR Rel-16, there is motivation to read the RMSI from neighboring cell to resolve the confusion of cell global identity (CGI), wherein the neighboring cell could be a secondary cell (SCell) such that the SS/PBCH block in the neighboring cell may or may not be located on a synchronization raster entry, which gives the motivation for enhancing the reception of RMSI in NR Rel-16.

Figure 8:
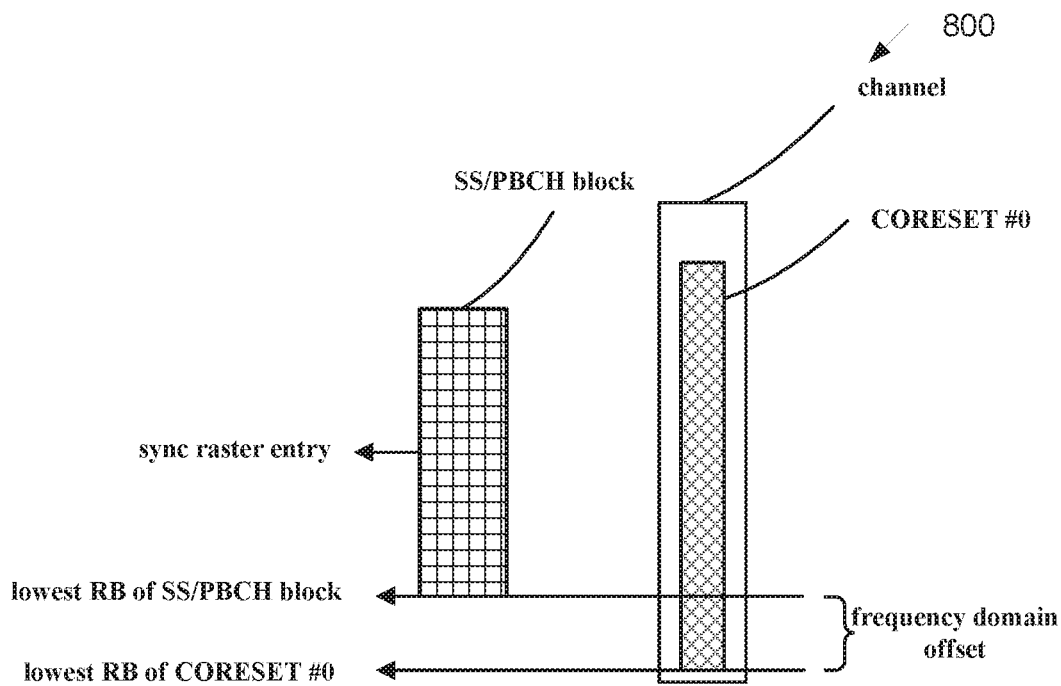
FIG. 8 illustrates an example frequency domain offset between SS/PBCH block and CORESET #0 according to embodiments of the present disclosure.

FIG. 8 illustrates an example frequency domain offset 800 between SS/PBCH block and CORESET #0 according to embodiments of the present disclosure. An embodiment of the frequency domain offset 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

FIG. 8 illustrates a frequency domain offset between SS/PBCH block and CORESET #0 in NR Rel-15.

The present disclosure focuses on the mechanism and methodology to support UE's reception of remaining minimum system information (RMSI) from a neighboring cell, e.g., wherein the associated SS/PBCH block is not located on a synchronization raster entry. If the associated SS/PBCH block is located on a synchronization raster entry, the NR Rel-15 determination method can be reused, i.e., the UE determines the offset from MIB of the associated SS/PBCH block.

In one embodiment, a UE can be configured by a gNB to monitor the Type-PDCCH, and to decode the corresponding PDSCH of RMSI upon successfully decoding of the Type0-PDCCH in a cell.

In one example, a UE can be configured with at least the frequency location of an SS/PBCH block, wherein the Type0-PDCCH and corresponding RMSI is QCLed with this SS/PBCH block. For instance, this example is applicable to the scenario that the UE is configured by the gNB to read the content of RMSI, e.g., from a neighboring cell.

In one example, in addition to the configured frequency location of an SS/PBCH block, the subcarrier spacing (SCS) of SS/PBCH block is also configured to the UE.

In another example, in addition to the configured frequency location of an SS/PBCH block, the SCS of SS/PBCH block is also configured to the UE, if the frequency location does not correspond to a synchronization raster entry.

In yet another example, the SCS of SS/PBCH block is not configured to the UE, and the UE blind detects the SCS of SS/PBCH block, e.g., between 15 kHz and 30 kHz.

In yet another example, in addition to the configured frequency location of an SS/PBCH block, a frequency offset is also configured to the UE, wherein the frequency offset can be used by the UE to determine the frequency domain difference between the lowest RB of SS/PBCH block and the lowest RB of CORESET #0.

In yet another example, in addition to the configured frequency location of an SS/PBCH block, a second frequency location is also configured to the UE, wherein the second frequency location can be used by the UE as a reference frequency location to determine the frequency domain difference between the lowest RB of SS/PBCH block and the lowest RB of CORESET #0. In one aspect, the second frequency location can be a synchronization raster entry (e.g., defined by a GSCN value).

In one example, a UE can determine a frequency domain offset (e.g., denoted as O) from the MIB of the detected SS/PBCH block, and the UE can determine the offset from a smallest RB index of the CORESET for Type0-PDCCH CSS set to a smallest RB index of the common RB overlapping with a first RB of the detected SS/PBCH block is the same as the determined frequency domain offset (e.g., O).

In one instance, the frequency domain difference between the lowest RB of SS/PBCH block and the lowest RB of CORESET #0 is configured to the UE directly, e.g., by MIB, regardless of the SS/PBCH block is located on a synchronization raster entry or not.

In another instance, the frequency offset can be configured, potentially jointly coded with other configurations, in MIB for UE to determine the frequency domain difference between the lowest RB of SS/PBCH block and the lowest RB of CORESET #0, and the candidate values of the frequency offsets to be configured can be divided into 2 groups: one group corresponds to the SS/PBCH blocks located on the synchronization raster entry, and the other group corresponds to the SS/PBCH blocks not located on the synchronization raster entry.

In yet another instance, the first group of offsets is only applicable to primary cell (PCell) and/or primary secondary cell (PSCell), e.g., for initial cell search purpose only. In yet another instance, the second group of offsets can be applicable to any cell (e.g., one of PCell, SCell, or PSCell).

Figure 9:
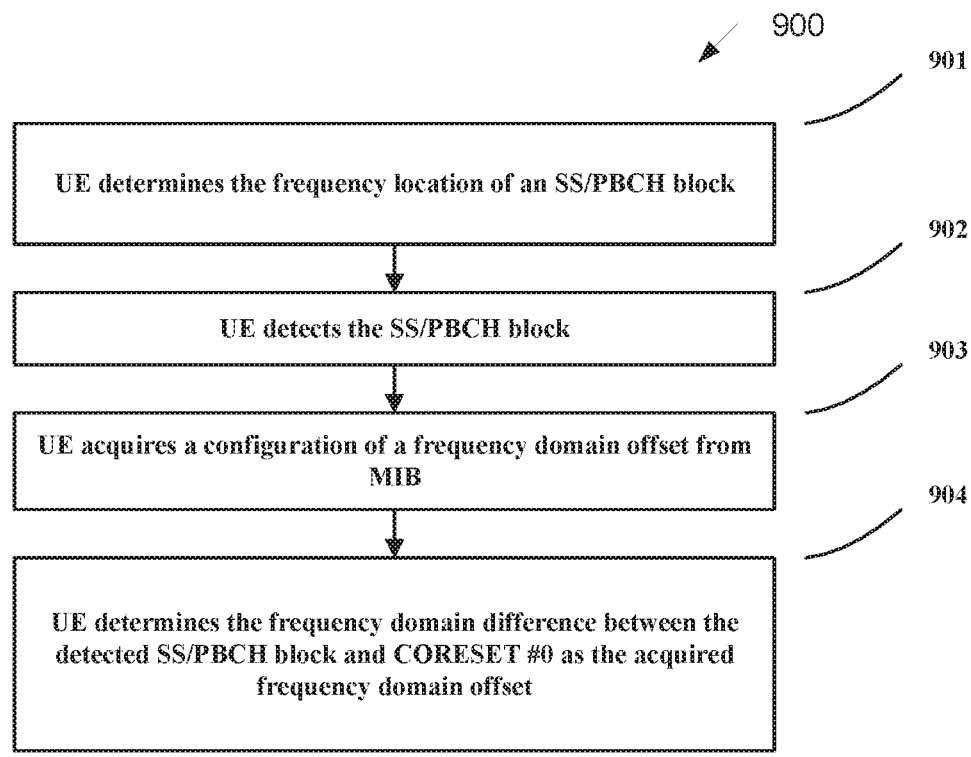
FIG. 9 illustrates a flow chart of a UE procedure for determining the frequency location of CORESET #0 according to embodiments of the present disclosure.

FIG. 9 illustrates a flow chart of a UE procedure 900 for determining the frequency location of CORESET #0 according to embodiments of the present disclosure. An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 9, the UE procedure 900 begins at step 901. In step 901, a UE determines the frequency location of an SS/PBCH block. In step 902, the UE detects the SS/PBCH block. In step 903, the UE acquires a configuration of a frequency domain offset from MIB. Finally, in step 904, the UE determines the frequency domain difference between the detected SS/PBCH block and CORESET #0 as the acquired frequency domain offset.

In one example, there can be two candidate frequency offset values. For one instance, one of the frequency offset value (e.g., 0) is used if the detected SS/PBCH block is on the synchronization raster entry, and the other frequency offset value (e.g., BW_CORESET-BW_SSB) is used if the detected SS/PBCH block is not on the synchronization raster entry. For another instance, one of the frequency offset value (e.g., 0 RB) is used if the detected SS/PBCH block is on the synchronization raster entry or within a small range from the synchronization raster entry, and the other frequency offset value (e.g., BW_CORESET-BW_SSB) is used otherwise.

In one example, BW_CORESET is the bandwidth of CORESET #0, which is e.g., 48 RBs for 30 kHz SCS, or 96 RBs for 15 kHz SCS, and BW_SSB is the bandwidth of SS/PBCH block, which is e.g., 20 RBs.

In one instance, a UE can read MIB to acquire the configuration of the offset from a configuration table, wherein the table is common, regardless SS/PBCH block is on or off synchronization raster entry, and is determined with respect to a combination of the SCS of SS/PBCH block and CORESET #0.

An example configuration table in MIB for both SCS of SS/PBCH block and CORESET #0 as 30 kHz is shown in TABLE 1. In one aspect, only configurations with index 0 and 2 are expected by the UE on a PCell and/or PSCell, e.g., in initial cell search procedure.

TABLE 1

An example configuration table in MIB for both SCS of SS/PBCH block and CORESET #0 as 30 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 48 | 1 | 0 |
| 1 | 1 | 48 | 1 | 28 |
| 2 | 1 | 48 | 2 | 0 |
| 3 | 1 | 48 | 2 | 28 |

An example configuration table in MIB for both SCS of SS/PBCH block and CORESET #0 as 15 kHz is shown in TABLE 2. In one aspect, only configurations with index 0 and 2 are expected by the UE on a PCell and/or PSCell, e.g., in initial cell search procedure.

TABLE 2

An example configuration table in MIB for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 96 | 1 | 0 |
| 1 | 1 | 96 | 1 | 76 |
| 2 | 1 | 96 | 2 | 0 |
| 3 | 1 | 96 | 2 | 76 |

In one instance, a UE can read MIB to acquire the configuration of the offset from a configuration table, wherein the table is separately defined for whether the SS/PBCH block is located on a synchronization raster entry or not (or within a range from the synchronization raster entry or not), and is determined with respect to a combination of the SCS of SS/PBCH block and CORESET #0.

For one sub-example, an example configuration table in MIB for both SCS of SS/PBCH block and CORESET #0 as 30 kHz is TABLE 1 with row index 0 and 2 only, for SS/PBCH block located on the synchronization raster (or within a range from the synchronization raster entry).

For another sub-example, an example configuration table in MIB for both SCS of SS/PBCH block and CORESET #0 as 30 kHz is TABLE 1 with row index 1 and 3 only, for SS/PBCH block located off the synchronization raster (or outside a range from the synchronization raster entry).

For yet another sub-example, an example configuration table in MIB for both SCS of SS/PBCH block and CORESET #0 as 15 kHz is TABLE 2 with row index 0 and 2 only, for SS/PBCH block located on the synchronization raster (or within a range from the synchronization raster entry).

For yet another sub-example, an example configuration table in MIB for both SCS of SS/PBCH block and CORESET #0 as 15 kHz is TABLE 2 with row index 1 and 3 only, for SS/PBCH block located off the synchronization raster (or outside a range from the synchronization raster entry).

In another example, there can be more than two candidate frequency offset values. For one instance, at least one of the frequency offset value (e.g., 0 RB) can be used if the detected SS/PBCH block is on the synchronization raster entry, and at least one of the remaining frequency offset values can be used if the detected SS/PBCH block is not on the synchronization raster entry. For another instance, at least one of the frequency offset value (e.g., 0 RB) can be used if the detected SS/PBCH block is with a range from the synchronization raster entry, and at least one of the remaining frequency offset values can be used if the detected SS/PBCH block is outside the range from the synchronization raster entry.

In one instance, the configuration table in MIB is common regardless the SS/PBCH block is located on a synchronization raster entry (or within a range from the synchronization raster entry) or not, and is determined with respect to a combination of the SCS of SS/PBCH block and CORESET #0.

In another instance, the configuration table in MIB is separately defined for whether the SS/PBCH block is located on a synchronization raster entry (or within a range from the synchronization raster entry) or not, and is determined with respect to a combination of the SCS of SS/PBCH block and CORESET #0. For this aspect, an example configuration table in MIB can take a subset of the rows in the example tables in this disclosure, for SS/PBCH block located on a synchronization raster entry (or within a range from the synchronization raster entry) (e.g., those rows with Offset as 0 RB), and an example configuration table in MIB can take the remaining subset of rows in the example tables in this disclosure, for SS/PBCH block not located on a synchronization raster entry (or outside a range from the synchronization raster entry).

An example configuration table in MIB for both SCS of SS/PBCH block and CORESET #0 as 30 kHz is shown in TABLE 3. In one aspect, only configurations with index 0 and 3 are expected by the UE on a PCell and/or PSCell, e.g., in initial cell search procedure.

TABLE 3

An example configuration table in MIB for both SCS of SS/PBCH block and CORESET #0 as 30 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 48 | 1 | 0 |
| 1 | 1 | 48 | 1 | 14 |
| 2 | 1 | 48 | 1 | 28 |
| 3 | 1 | 48 | 2 | 0 |
| 4 | 1 | 48 | 2 | 14 |
| 5 | 1 | 48 | 2 | 28 |

An example configuration table in MIB for both SCS of SS/PBCH block and CORESET #0 as 15 kHz is shown in TABLE 4. In one aspect, only configurations with index 0 and 3 are expected by the UE on a PCell and/or PSCell, e.g., in initial cell search procedure.

TABLE 4

An example configuration table in MIB for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 96 | 1 | 0 |
| 1 | 1 | 96 | 1 | 38 |
| 2 | 1 | 96 | 1 | 76 |
| 3 | 1 | 96 | 2 | 0 |
| 4 | 1 | 96 | 2 | 38 |
| 5 | 1 | 96 | 2 | 76 |

An example configuration table in MIB for both SCS of SS/PBCH block and CORESET #0 as 30 kHz is shown in TABLE 5. The set or a subset of the entries can be used. In one aspect, only configurations with index 0 and 8 are expected by the UE on a PCell and/or PSCell, e.g., in initial cell search procedure. Note that the interval between offset values is at most 4 RBs, which corresponds the flexibility of reusing a configuration by shifting the CORESET #0 within a carrier, wherein the flexibility is given by BW_CH−BW_CORESET+1, and BW_CH is the bandwidth of carrier, BW_CORESET is the bandwidth of CORESET #0, such that BW_CH−BW_CORESET+1=51−48+1=4 RBs, for SCS of SS/PBCH block and CORESET #0 as 30 kHz.

TABLE 5

An example configuration table in MIB for both SCS of SS/PBCH block and CORESET #0 as 30 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 48 | 1 | 0 |
| 1 | 1 | 48 | 1 | 4 |
| 2 | 1 | 48 | 1 | 8 |
| 3 | 1 | 48 | 1 | 12 |
| 4 | 1 | 48 | 1 | 16 |
| 5 | 1 | 48 | 1 | 20 |
| 6 | 1 | 48 | 1 | 24 |
| 7 | 1 | 48 | 1 | 28 |
| 8 | 1 | 48 | 2 | 0 |
| 9 | 1 | 48 | 2 | 4 |
| 10 | 1 | 48 | 2 | 8 |
| 11 | 1 | 48 | 2 | 12 |
| 12 | 1 | 48 | 2 | 16 |
| 13 | 1 | 48 | 2 | 20 |
| 14 | 1 | 48 | 2 | 24 |
| 15 | 1 | 48 | 2 | 28 |

An example configuration table in MIB for both SCS of SS/PBCH block and CORESET #0 as 15 kHz is shown in TABLE 6. The set or a subset of the entries can be used. In one aspect, only configurations with index 0 and 7 are expected by the UE on a PCell and/or PSCell, e.g., in initial cell search procedure.

TABLE 6

An example configuration table in MIB for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 96 | 1 | 0 |
| 1 | 1 | 96 | 1 | 12 |
| 2 | 1 | 96 | 1 | 24 |
| 3 | 1 | 96 | 1 | 38 |
| 4 | 1 | 96 | 1 | 52 |
| 5 | 1 | 96 | 1 | 64 |
| 6 | 1 | 96 | 1 | 76 |
| 7 | 1 | 96 | 2 | 0 |
| 8 | 1 | 96 | 2 | 12 |

TABLE 6-continued

An example configuration table in MIB for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 9  | 1 | 96 | 2 | 24 |
| 10 | 1 | 96 | 2 | 38 |
| 11 | 1 | 96 | 2 | 52 |
| 12 | 1 | 96 | 2 | 64 |
| 13 | 1 | 96 | 2 | 76 |

An example configuration table in MIB for both SCS of SS/PBCH block and CORESET #0 as 15 kHz is shown in TABLE 7. The set or a subset of the entries can be used. In one aspect, only configurations with index 0 and 8 are expected by the UE on a PCell and/or PSCell, e.g., in initial cell search procedure. Note that the interval between offset values is at most 11 RBs, which corresponds the flexibility of reusing a configuration by shifting the CORESET #0 within a carrier, wherein the flexibility is given by BW_CH−BW_CORESET+1, and BW_CH is the bandwidth of carrier, BW_CORESET is the bandwidth of CORESET #0, such that BW_CH−BW_CORESET+1=106−96+1=11 RBs, for SCS of SS/PBCH block and CORESET #0 as 15 kHz.

TABLE 7

An example configuration table in MIB for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0  | 1 | 96 | 1 | 0  |
| 1  | 1 | 96 | 1 | 11 |
| 2  | 1 | 96 | 1 | 22 |
| 3  | 1 | 96 | 1 | 33 |
| 4  | 1 | 96 | 1 | 44 |
| 5  | 1 | 96 | 1 | 55 |
| 6  | 1 | 96 | 1 | 66 |
| 7  | 1 | 96 | 1 | 76 |
| 8  | 1 | 96 | 2 | 0  |
| 9  | 1 | 96 | 2 | 11 |
| 10 | 1 | 96 | 2 | 22 |
| 11 | 1 | 96 | 2 | 33 |
| 12 | 1 | 96 | 2 | 44 |
| 13 | 1 | 96 | 2 | 55 |
| 14 | 1 | 96 | 2 | 66 |
| 15 | 1 | 96 | 2 | 76 |

An example configuration table in MIB for both SCS of SS/PBCH block and CORESET #0 as 15 kHz is shown in TABLE 8. The set or a subset of the entries can be used. In one aspect, only configurations with index 0 and 8 are expected by the UE on a PCell and/or PSCell, e.g., in initial cell search procedure. Note that the interval between offset values is at most 11 RBs, which corresponds the flexibility of reusing a configuration by shifting the CORESET #0 within a carrier, wherein the flexibility is given by BW_CH−BW_CORESET+1, and BW_CH is the bandwidth of carrier, BW_CORESET is the bandwidth of CORESET #0, such that BW_CH−BW_CORESET+1=106−96+1=11 RBs, for SCS of SS/PBCH block and CORESET #0 as 15 kHz.

TABLE 8

An example configuration table in MD3 for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 0 | 1 | 96 | 1 | 0  |
| 1 | 1 | 96 | 1 | 11 |

TABLE 8-continued

An example configuration table in MD3 for both SCS of SS/PBCH block and CORESET #0 as 15 kHz.

| Index | SS/PBCH block and CORESET multiplexing pattern | CORESET Bandwidth (e.g., BW_CORESET in RBs) | Number of Symbols for CORESET | Offset (e.g., O in RBs) |
|---|---|---|---|---|
| 2 | 1 | 96 | 1 | 22 |
| 3 | 1 | 96 | 1 | 33 |
| 4 | 1 | 96 | 1 | 43 |
| 5 | 1 | 96 | 1 | 54 |
| 6 | 1 | 96 | 1 | 65 |
| 7 | 1 | 96 | 1 | 76 |
| 8 | 1 | 96 | 2 | 0 |
| 9 | 1 | 96 | 2 | 11 |
| 10 | 1 | 96 | 2 | 22 |
| 11 | 1 | 96 | 2 | 33 |
| 12 | 1 | 96 | 2 | 43 |
| 13 | 1 | 96 | 2 | 54 |
| 14 | 1 | 96 | 2 | 65 |
| 15 | 1 | 96 | 2 | 76 |

In one instance, the UE can determine a frequency domain offset (e.g., denoted as O) from the MIB of the detected SS/PBCH block, and the UE can determine an offset from a smallest RB index of the CORESET for Type0-PDCCH CSS set to a smallest RB index of the common RB overlapping with a first RB of the detected SS/PBCH block based on the determined frequency domain offset (e.g., O).

In such instance, the offset from a smallest RB index of the CORESET for Type0-PDCCH CSS set to a smallest RB index of the common RB overlapping with a first RB of the detected SS/PBCH block is determined as the sum of the first frequency domain offset determined from MIB (e.g., O) and a second frequency domain offset calculated by the UE (e.g., denoted as X), e.g., O+X, wherein the offsets are defined with respect to the SCS of the CORESET for Type0-PDCCH CSS set. In one instance, X can be determined as the frequency difference between the frequency location of the detected SS/PBCH block and a reference frequency location which is known to the UE.

Figure 10A:
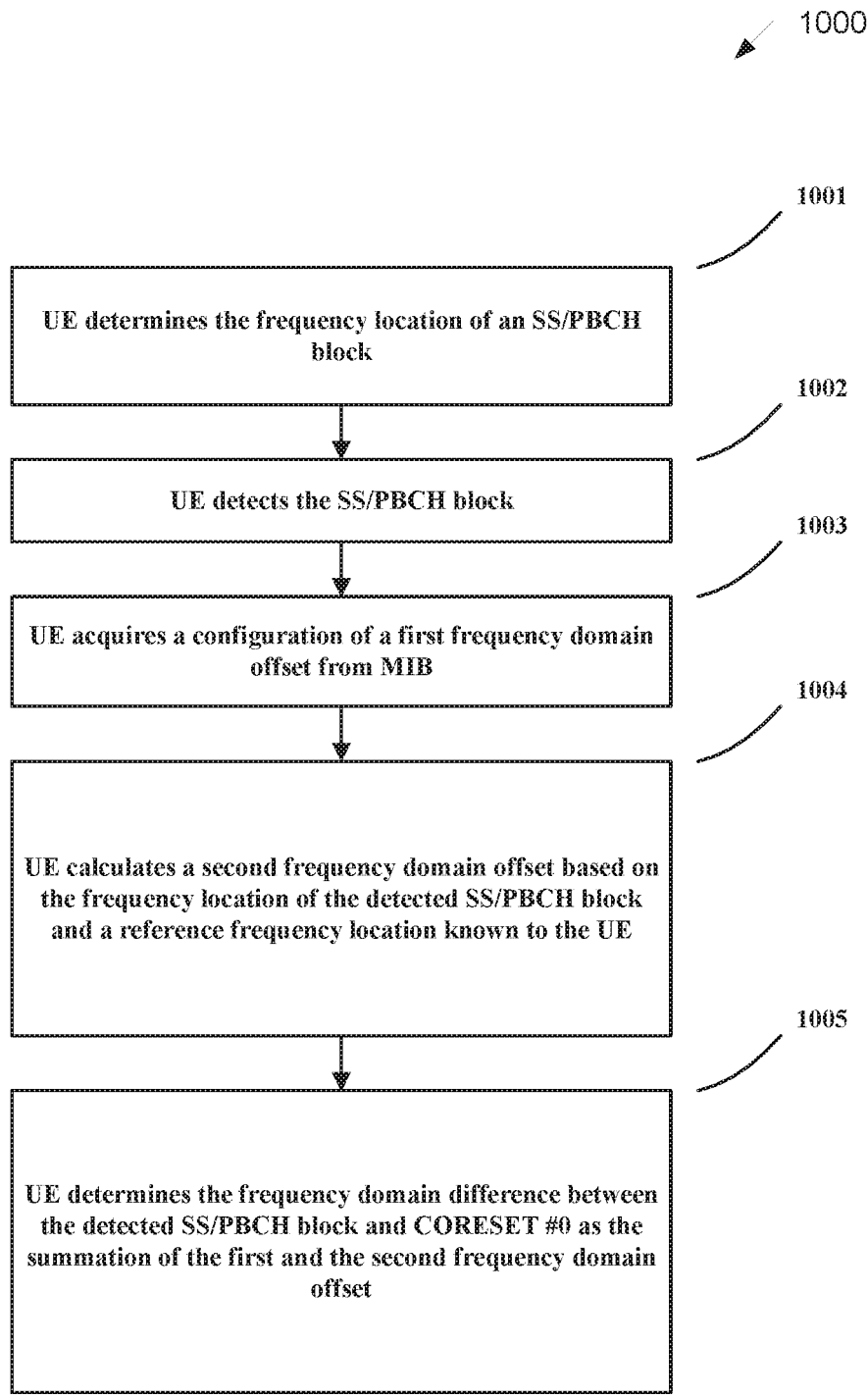
FIG. 10A illustrates a flow chart of a UE procedure for determining the frequency location of CORESET #0 according to embodiments of the present disclosure.

FIG. 10A illustrates a flow chart of a UE procedure 1000 for determining the frequency location of CORESET #0 according to embodiments of the present disclosure. An embodiment of the UE procedure 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 10A, the UE procedure begins at step 1001. In step 1001, the UE determines the frequency location of an SS/PBCH block. In step 1002, the UE detects the SS/PBCH block. In step 1003, the UE acquires a configuration of a first frequency domain offset from MIB. In step 1004, the UE calculates a second frequency domain offset based on the frequency location of the detected SS/PBCH block and a reference frequency location known to the UE. In step 1005, the UE determines the frequency domain difference between the detected SS/PBCH block and CORESET #0 as the summation of the first and the second frequency domain offset.

Figure 10B:
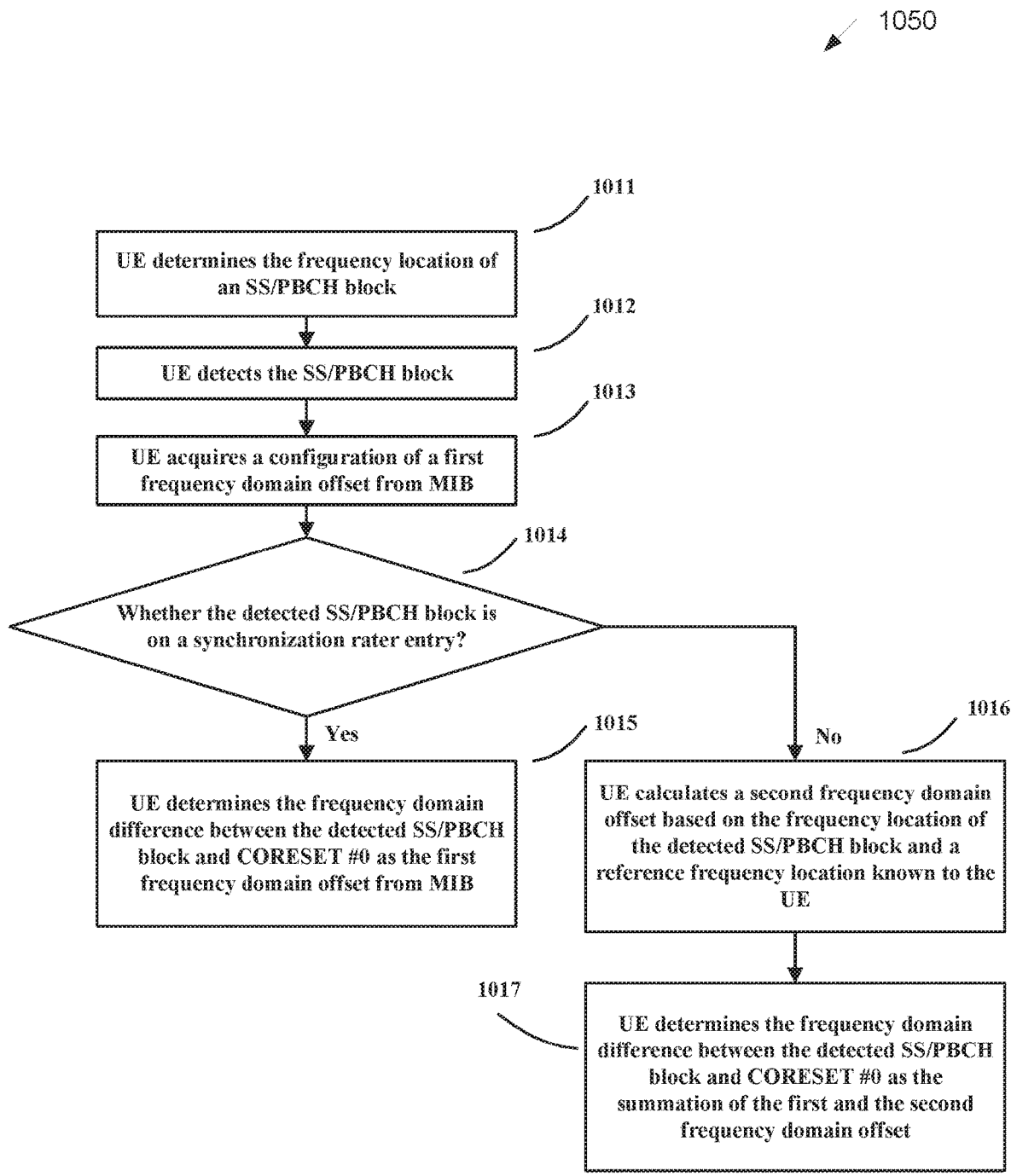
FIG. 10B illustrates a flow chart of a UE procedure for determining the frequency location of CORESET #0 according to embodiments of the present disclosure.

FIG. 10B illustrates a flow chart of a UE procedure 1050 for determining the frequency location of CORESET #0 according to embodiments of the present disclosure. An embodiment of the UE procedure 1050 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 10B, the UE procedure 1050 begins at step 1011. In step 1011, the UE determines the frequency location of an SS/PBCH block. In step 1012, the UE detects the SS/PBCH block. In step 1013, the UE acquires a configuration of a first frequency domain offset from MIB. In step 1014, the UE determines whether the detected SS/PBCH block is on a synchronization rater entry. In step 1014, if the UE determines that the detected SS/PBCH block is on a synchronization rater entry, the UE procedure 1050 goes to step 1015. In step 1014, if the UE does not determine, the UE procedure 1050 goes to step 1016. In step 1015, the UE determines the frequency domain difference between the detected SS/PBCH block and CORESET #0 as the first frequency domain offset from MIB. In step 1016, the UE calculates a second frequency domain offset based on the frequency location of the detected SS/PBCH block and a reference frequency location known to the UE. Finally, in step 1017, the UE determines the frequency domain difference between the detected SS/PBCH block and CORESET #0 as the summation of the first and the second frequency domain offset An illustration of the example UE procedure for determining the frequency location of CORESET #0 is shown in FIG. 10A or FIG. 10B. Note that FIG. 10A and FIG. 10B could be equivalent if the second offset is calculated as 0 when the detected SS/PBCH block is located on the synchronization raster entry.

Figure 11:
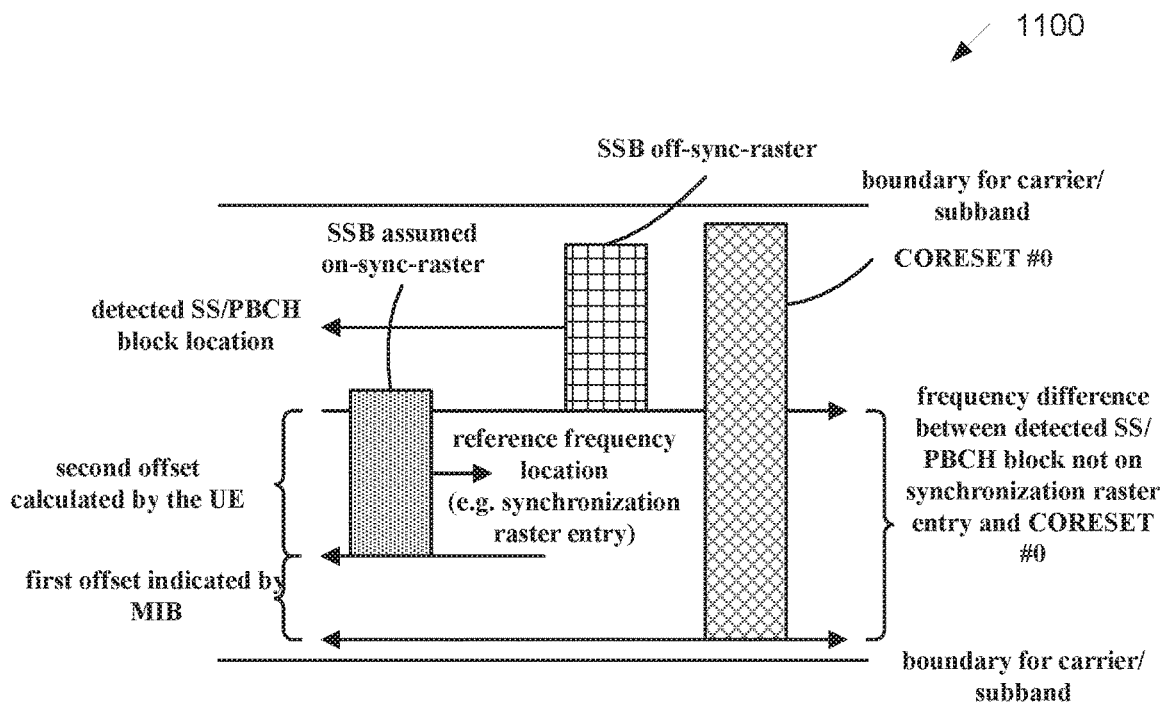
FIG. 11 illustrates an example relationship between frequency offsets according to embodiments of the present disclosure.

FIG. 11 illustrates an example relationship between frequency offsets 1100 according to embodiments of the present disclosure. An embodiment of the relationship between frequency offsets 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

An illustration of the relationship between the frequency offsets in the aforementioned examples and/or instances is shown in FIG. 11.

In one example, the reference frequency location can be chosen as the frequency position corresponding to the GSCN of the synchronization raster entry in the same nominal carrier/sub-band/LBT bandwidth where channel sensing is performed (assuming there is only one such synchronization raster entry) as the detected SS/PBCH block.

In another example, the reference frequency location can be chosen as a synchronization raster entry, such that the offset (e.g., O+X) is an integer between 0 and BW_CORESET−BW_SSB, wherein BW_CORESET is the BW of CORESET #0 (e.g., 48 RBs for 30 kHz SCS, or 96 RBs for 15 kHz SCS), and BW_SSB is the BW of SSB (e.g., 20 RBs).

In yet another example, the reference frequency location can be chosen as the synchronization raster entry that is the closest one comparing to the frequency location of the detected SS/PBCH block and with lower frequency.

In yet another example, the reference frequency location can be chosen as the synchronization raster entry that is the closest one comparing to the frequency location of the detected SS/PBCH block and with higher frequency.

In yet another example, the reference frequency location can be chosen as the synchronization raster entry that is the lowest one within the group of synchronization raster entries predefined in the same nominal carrier/sub-band/LBT bandwidth where channel sensing is performed as the detected SS/PBCH block.

In yet another example, the reference frequency location can be chosen as the synchronization raster entry that is the highest one within the group of synchronization raster entries predefined in the same nominal carrier/sub-band/LBT bandwidth where channel sensing is performed as the detected SS/PBCH block.

In yet another example, the reference frequency location can be chosen as the one configured by the gNB (e.g., a GSCN value).

In one example, a UE first determines the frequency location for detecting the SS/PBCH block (e.g., the frequency location can be configured by a gNB in a high layer parameter ssbFrequency), and read the MIB of the detected SS/PBCH block to acquire the first frequency offset (e.g., from the field of controlResourceSetZero in pdcch-ConfigSIB1), and calculate the second frequency offset based on the difference between the frequency location of the detected SS/PBCH block and the synchronization raster entry, in term of RB with respect to the SCS of CORESET #0, then determines the offset from a smallest RB index of the CORESET for Type0-PDCCH CSS set to a smallest RB index of the common RB overlapping with a first RB of the detected SS/PBCH block as the sum of the first determined frequency domain offset read from MIB and the second frequency domain offset calculated by the UE.

In one instance, the second frequency offset (e.g., X) can be determined by the offset from a smallest RB index of the common RB overlapping with a first RB of the detected SS/PBCH block (e.g., with a location configured by a gNB in a high layer parameter ssbFrequency) to a smallest RB index of the common RB overlapping with a first RB of an SS/PBCH block hypothetically located on the reference frequency location (e.g., frequency position corresponding to the GSCN of the synchronization raster entry within the same nominal carrier/sub-band/LBT bandwidth where channel sensing is performed), wherein the SS/PBCH block hypothetically located on the reference frequency location has same SCS as the detected SS/PBCH block.

In another instance, the second frequency offset (e.g., X) can be determined by a sum of two parts: a first part is an offset from a smallest RB index of the common RB overlapping with a first RB of the detected SS/PBCH block to a RB index of the common RB overlapping with the reference frequency location (e.g., frequency position corresponding to the GSCN of the synchronization raster entry within the same nominal carrier/sub-band/LBT bandwidth where channel sensing is performed); and a second part is a fixed offset, e.g., half of the BW of SS/PBCH block as 10 RBs.

In yet another instance, the second frequency offset (e.g., X) can be determined as the offset from a RB index of the common RB overlapping with the frequency location of detected SS/PBCH block (e.g., the high layer parameter ssbFrequency) to a RB index of the common RB overlapping with the reference frequency location (e.g., the synchronization raster entry within the same nominal carrier/sub-band/LBT bandwidth where channel sensing is performed).

In yet another instance, the second frequency offset can be determined by: X=(F_REF−SS_REF)/SCS_CORESET/N_RE where F_REF is the RF reference frequency in MHz corresponding to the NR-ARFCN of ssbFrequency, SS_REF is the RF reference frequency in MHz correspond to the GSCN of the synchronization raster entry (as in an example the reference frequency location of this instance), SCS_CORESET is the SCS of CORESET #0 (e.g., either 15 kHz or 30 kHz), and N_RE is the number of REs in a RB (e.g., N_RE=12).

In one example, a UE expects the second frequency offset (e.g., X) is an integer (e.g., the RE level offset k_SSB is the same for SS/PBCH blocks on and off synchronization raster entry in the nominal carrier/sub-band/LBT bandwidth where channel sensing is performed).

In one example, the second frequency offset (e.g., X) could be negative (e.g., F_REF<SS_REF).

In one example, a UE expects the offset (e.g., O+X) is an integer between 0 and BW_CORESET−BW_SSB, wherein BW_CORESET is the BW of CORESET #0 (e.g., 48 RBs for 30 kHz SCS, or 96 RBs for 15 kHz SCS), and BW_SSB is the BW of SSB (e.g., 20 RBs).

In one example, a UE expects the offset (e.g., O+X) is an integer between 0 and BW_CH−BW_SSB, wherein BW_CH is the BW of nominal carrier/sub-band/LBT bandwidth where channel sensing is performed (e.g., 51 RBs for 30 kHz SCS, or 106 RBs for 15 kHz SCS), and BW_SSB is the BW of SSB (e.g., 20 RBs). In yet another aspect, this instance is applicable to the scenario that SS/PBCH blocks with 30 kHz SCS and 15 kHz SCS are located on the same reference frequency location (the synchronization raster entry) when determining the frequency offset configuration for PCell and/or PSCell. An illustration of this scenario is shown in FIG. 12.

Figure 12:
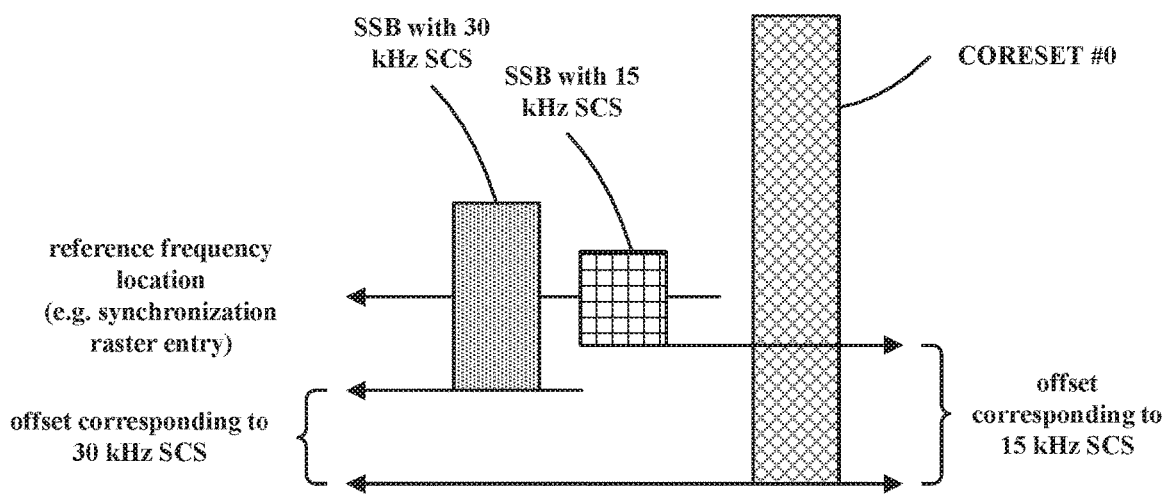
FIG. 12 illustrates an example SS/PBCH blocks with 30 kHz SCS and 15 kHz SCS located on the same reference frequency location according to embodiments of the present disclosure.

FIG. 12 illustrates an example SS/PBCH blocks 1200 with 30 kHz SCS and 15 kHz SCS located on the same reference frequency location according to embodiments of the present disclosure. An embodiment of the SS/PBCH blocks 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In one instance, the second frequency offset can be determined by: X=floor((F_REF−SS_REF)/SCS_CORESET/N_RE) where F_REF is the RF reference frequency in MHz corresponding to the NR-ARFCN of ssbFrequency, SS_REF is the RF reference frequency in MHz correspond to the GSCN of the synchronization raster entry (as in an example the reference frequency location), SCS_CORESET is the SCS of CORESET #0 (e.g., either 15 kHz or 30 kHz), and N_RE is the number of REs in a RB (e.g., N_RE=12). "floor(x)" refers to the floor operation that gives the largest integer smaller than or equal to x.

In one instance, a UE expects the offset (e.g., O+X) is an integer between 0 and BW_CORESET−BW_SSB, wherein BW_CORESET is the BW of CORESET #0 (e.g., 48 RBs for 30 kHz SCS, or 96 RBs for 15 kHz SCS), and BW_SSB is the BW of SSB (e.g., 20 RBs).

In another instance, a UE expects the offset (e.g., O+X) is an integer between 0 and BW_CH−BW_SSB, wherein BW_CH is the BW of nominal carrier/sub-band/LBT bandwidth where channel sensing is performed (e.g., 51 RBs for 30 kHz SCS, or 106 RBs for 15 kHz SCS), and BW_SSB is the BW of SSB (e.g., 20 RBs). In another aspect, this instance is applicable to the scenario that SS/PBCH blocks with 30 kHz SCS and 15 kHz SCS are located on the same reference frequency location (the synchronization raster entry) when determining the frequency offset configuration for PCell and/or PSCell. An illustration of this scenario is shown in FIG. 12.

In one instance, the second frequency offset can be determined by: X=((F_REF−SS_REF)/SCS_CORESET−k_SSB)/N_RE, where F_REF is the RF reference frequency in MHz corresponding to the NR-ARFCN of ssbFrequency, SS_REF is the RF reference frequency in MHz correspond to the GSCN of the synchronization raster entry (as in an example the reference frequency location of this instance), SCS_CORESET is the SCS of CORESET #0 (e.g., either 15 kHz or 30 kHz), and N_RE is the number of REs in a RB (e.g., N_RE=12).

In one instance, a UE expects the offset (e.g., O+X) is an integer between 0 and BW_CORESET−BW_SSB, wherein BW_CORESET is the BW of CORESET #0 (e.g., 48 RBs for 30 kHz SCS, or 96 RBs for 15 kHz SCS), and BW_SSB is the BW of SSB (e.g., 20 RBs).

In one instance, a UE expects the offset (e.g., O+X) is an integer between 0 and BW_CH−BW_SSB, wherein BW_CH is the BW of nominal carrier/sub-band/LBT bandwidth where channel sensing is performed (e.g., 51 RBs for 30 kHz SCS, or 106 RBs for 15 kHz SCS), and BW_SSB is the BW of SSB (e.g., 20 RBs).

In one instance, it is applicable that SS/PBCH blocks with 30 kHz SCS and 15 kHz SCS are located on the same reference frequency location (the synchronization raster entry) when determining the frequency offset configuration for PCell and/or PSCell. An illustration of this scenario is shown in FIG. 12.

In one instance, the second frequency offset can be determined by: X=floor((F_REF−SS_REF)/SCS_CORESET/N_RE), if k_SSB*15 kHz/SCS_CORESET>N_SC; and X=floor((F_REF−SS_REF)/SCS_CORESET/N_RE)+1, if k_SSB*15 kHz/SCS_CORESET<N_SC where F_REF is the RF reference frequency in MHz corresponding to the NR-ARFCN of ssbFrequency, SS_REF is the RF reference frequency in MHz correspond to the GSCN of the synchronization raster entry (as in an example the reference frequency location of this instance), SCS_CORESET is the SCS of CORESET #0 (e.g., either 15 kHz or 30 kHz), N_RE is the number of REs in a RB (e.g., N_RE=12), N_SC is the residual number of subcarriers calculated from the offset given by: N_SC=(F_REF−SS_REF)/SCS_CORESET−X*N_RE where (F_REF−SS_REF)/SCS_CORESET is expected to be an integer, and k_SSB is given by the PBCH payload of the detected SS/PBCH block (e.g., the offset between the boundary of SS/PBCH block to the common resource grid).

"floor(x)" refers to the floor operation that gives the largest integer smaller than or equal to x. In one instance, the offset X can be negative (e.g., F_REF<SS_REF). In one further consideration, UE expects the offset (e.g., O+X) is an integer between 0 and BW_CORESET−BW_SSB, wherein BW_CORESET is the BW of CORESET #0 (e.g., 48 RBs for 30 kHz SCS, or 96 RBs for 15 kHz SCS), and BW_SSB is the BW of SSB (e.g., 20 RBs).

In another instance, a UE expects the offset (e.g., O+X) is an integer between 0 and BW_CH−BW_SSB, wherein BW_CH is the BW of nominal carrier/sub-band/LBT bandwidth where channel sensing is performed (e.g., 51 RBs for 30 kHz SCS, or 106 RBs for 15 kHz SCS), and BW_SSB is the BW of SSB (e.g., 20 RBs). In another aspect, this instance is applicable to the scenario that SS/PBCH blocks with 30 kHz SCS and 15 kHz SCS are located on the same reference frequency location (the synchronization raster entry) when determining the frequency offset configuration for PCell and/or PSCell. An illustration of this scenario is shown in FIG. 12.

In one example, all the aforementioned examples and/or instances can be applicable that the SS/PBCH blocks with different SCS (e.g., 30 kHz SCS and 15 kHz SCS) can be located on different reference frequency locations when determining the frequency offset configuration for PCell and/or PSCell, such that there can be an offset between the synchronization raster entry (which is the reference frequency location for determining the frequency offset configuration for 30 kHz SCS) and the reference frequency location for determining the frequency offset configuration for another SCS (e.g., 15 kHz) SCS.

Figure 13:
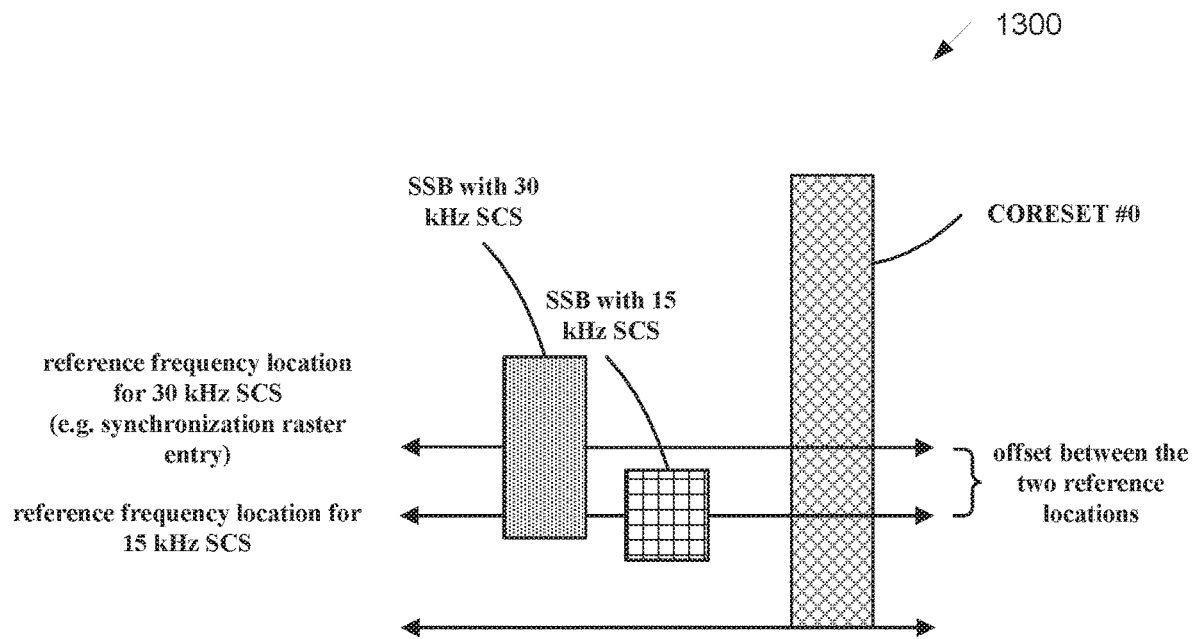
FIG. 13 illustrates an example SS/PBCH blocks with 30 kHz SCS and 15 kHz SCS located on different reference frequency location according to embodiments of the present disclosure.

FIG. 13 illustrates an example SS/PBCH blocks 1300 with 30 kHz SCS and 15 kHz SCS located on different reference frequency location according to embodiments of the present disclosure. An embodiment of the SS/PBCH blocks 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

If the reference frequency location for 15 kHz SCS is selected differently from the reference frequency location for 30 kHz SCS, a further offset can be applied to X for SCS of SS/PBCH block as 15 kHz (and no change for SCS of SS/PBCH block as 30 kHz), such that the second offset can be determined as X+X', where X is the offset specified in the instance of this approach, and X' is the further offset between the two reference locations.

In one example, X'=10 RB, such that the lowest boundary of SS/PBCH blocks located on the two different reference locations are aligned. In another example, X' corresponds to the smallest RB level offset from SS/PBCH block, with 15 kHz SCS and located on the synchronization raster entry, to the channel boundary, e.g., X'=13 RB.

In one example, a UE can determine a frequency domain offset (e.g., denoted as O) from the MIB of the detected SS/PBCH block, and the UE can determine the offset from a smallest RB index of the CORESET for Type0-PDCCH CSS set to a smallest RB index of the common RB overlapping with a first RB of the detected SS/PBCH block based on the determined frequency domain offset (e.g., O).

In such example, the offset from a smallest RB index of the CORESET for Type0-PDCCH CSS set to a smallest RB index of the common RB overlapping with a first RB of the corresponding SS/PBCH block is determined by a one-to-one mapping of the determined frequency domain offset from MIB (e.g., O).

Figure 14:
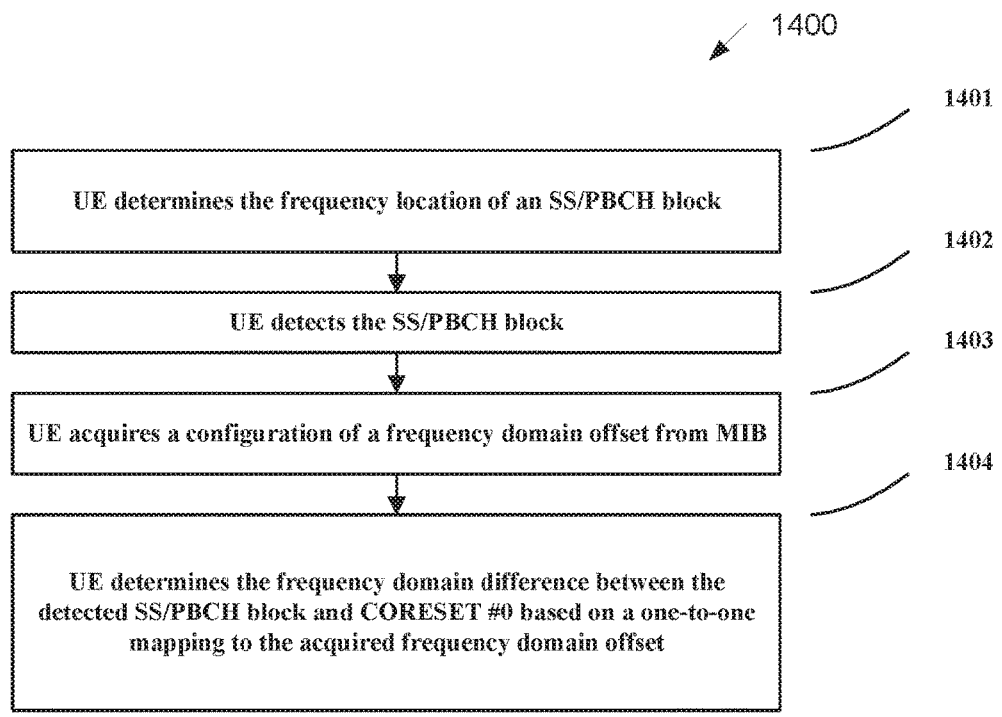
FIG. 14 illustrates a flow chart of a UE procedure for determining the frequency location of CORESET #0 according to embodiments of the present disclosure.

FIG. 14 illustrates a flow chart of a UE procedure 1400 for determining the frequency location of CORESET #0 according to embodiments of the present disclosure. An embodiment of the UE procedure 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 14, the UE procedure 1400 begins at step 1401. In step 1401, the UE determines the frequency location of an SS/PBCH block. In step 1402, the UE detects the SS/PBCH block. In step 1403, the UE acquires a configuration of a frequency domain offset from MIB. Finally, in step 1404, the UE determines the frequency domain difference between the detected SS/PBCH block and CORESET #0 based on a one-to-one mapping to the acquired frequency domain offset.

In one example, the frequency domain difference between the lowest RB of SS/PBCH block and the lowest RB of CORESET #0 is determined as the determined frequency domain offset+X (e.g., O+X), where X is a fixed value, e.g., fixed per SCS of SS/PBCH block.

In one sub-example, X=1 for all SCS of SS/PBCH blocks.

In another sub-example, X=4 for all SCS of SS/PBCH blocks.

In yet another sub-example, X=24 for SCS of SS/PBCH block as 30 kHz.

In yet another sub-example, X=48 for SCS of SS/PBCH block as 15 kHz.

In yet another sub-example, X=14 for SCS of SS/PBCH block as 30 kHz.

In yet another sub-example, X=38 for SCS of SS/PBCH block as 15 kHz.

In one example, the frequency domain difference between the lowest RB of SS/PBCH block and the lowest RB of CORESET #0 is determined as X− the frequency domain determined offset (e.g., X−O), where X is a fixed value, e.g., fixed per SCS of SS/PBCH block.

In one sub-example, X=48 for SCS of SS/PBCH block as 30 kHz.

In another sub-example, X=96 for SCS of SS/PBCH block as 15 kHz.

In yet another sub-example, X=28 for SCS of SS/PBCH block as 30 kHz.

In yet another sub-example, X=76 for SCS of SS/PBCH block as 15 kHz.

In one example, a UE can be configured a frequency domain offset (e.g., O_SSB) when the UE is configured to detect an SS/PBCH block, and the UE can determine the offset from a smallest RB index of the CORESET for Type0-PDCCH CSS set to a smallest RB index of the common RB overlapping with a first RB of the detected SS/PBCH block based on the configured frequency domain offset (e.g., O_SSB).

In one example, the UE can determine the offset from a smallest RB index of the CORESET for Type-PDCCH CSS set to a smallest RB index of the common RB overlapping with a first RB of the detected SS/PBCH block as the configured frequency domain offset (e.g., O_SSB).

In one example, the UE still needs to read the content of PBCH of the detected SS/PBCH block to determine the number of symbols for CORESET #0, and override the configured frequency domain offset (e.g., O) in the MIB of the detected SS/PBCH block by the configured frequency domain offset (e.g., O_SSB) to determine the offset from a smallest RB index of the CORESET for Type0-PDCCH CSS set to a smallest RB index of the common RB overlapping with a first RB of the detected SS/PBCH block.

In one example, it can be combined with the mentioned examples and/or approaches in this disclosure. If the UE is provided with the configuration of the frequency offset (e.g., O_SSB), the UE can determine the offset from a smallest RB index of the CORESET for Type-PDCCH CSS set to a smallest RB index of the common RB overlapping with a first RB of the detected SS/PBCH block as the configured frequency domain offset (e.g., O_SSB); otherwise, the UE can determine the offset from a smallest RB index of the CORESET for Type0-PDCCH CSS set to a smallest RB index of the common RB overlapping with a first RB of the detected SS/PBCH block as the sum of two offsets, wherein the first offset is acquired from MIB (e.g., O), and the second offset if calculated by the UE (e.g., X) according to the mentioned examples and/or instances in the present disclosure.

Figure 15A:
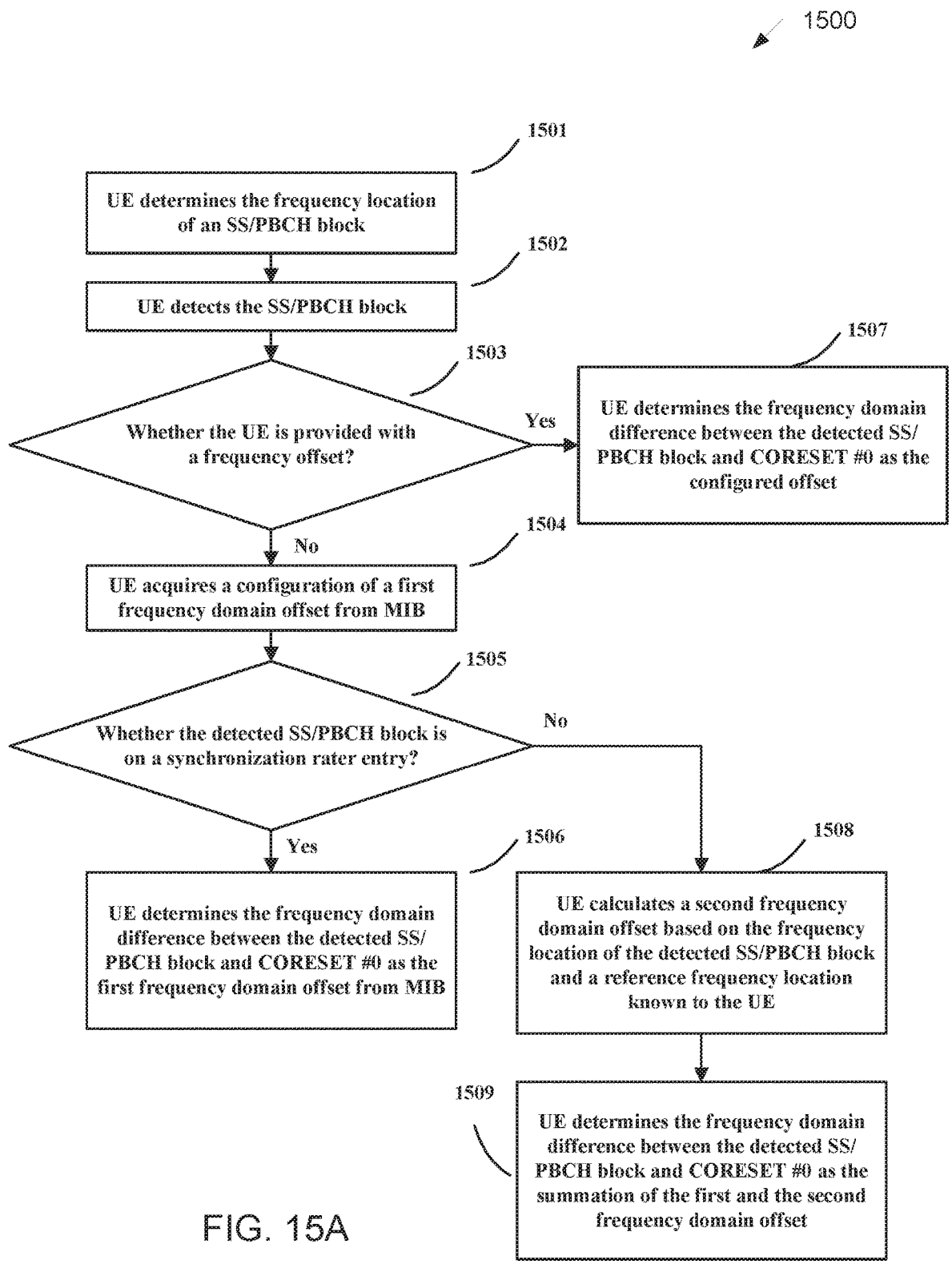
FIG. 15A illustrates a flow chart of a UE procedure for determining the frequency location of CORESET #0 according to embodiments of the present disclosure.

One example of the UE procedure for this aspect of this example is shown in FIG. 15A.

FIG. 15A illustrates a flow chart of a UE procedure 1500 for determining the frequency location of CORESET #0 according to embodiments of the present disclosure. An embodiment of the UE procedure 1500 shown in FIG. 15A is for illustration only. One or more of the components illustrated in FIG. 15A can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15A, the UE procedure 1500 begins at step 1501. In step 1501, the UE determines the frequency location of an SS/PBCH block. In step 1502, the UE detects the SS/PBCH block. In step 1503, the UE determines whether the UE is provided with a frequency offset. In step 1503, if the UE determines that the UE is provided with the frequency offset, the UE procedure 1500 goes to step 1507. In step 1503, if the E does not determine, the UE procedure 1500 goes to step 1504. In step 1504, the UE acquires a configuration of a first frequency domain offset from MIB. In step 1505, the UE determines whether the detected SS/PBCH block is on a synchronization rater entry. In step 1505, if the UE determines the detected SS/PBCH block is on a synchronization rater entry, the UE procedure 1500 goes to step 1506. In step 1505, if the UE does not determine, the UE procedures 1500 goes to step 1508. In step 1506, the UE determines the frequency domain difference between the detected SS/PBCH block and CORESET #0 as the first frequency domain offset from MIB. In step 1507, the UE determines the frequency domain difference between the detected SS/PBCH block and CORESET #0 as the configured offset. In step 1508, the UE calculates a second frequency domain offset based on the frequency location of the detected SS/PBCH block and a reference frequency location known to the UE. In step 1509, the UE determines the frequency domain difference between the detected SS/PBCH block and CORESET #0 as the summation of the first and the second frequency domain offset.

In another example, the UE can determine the offset from a smallest RB index of the CORESET for Type-PDCCH CSS set to a smallest RB index of the common RB overlapping with a first RB of the detected SS/PBCH block as the sum of a first offset as the configured frequency domain offset (e.g., O_SSB) and a second offset as the frequency domain offset acquired from the MIB of the detected SS/PBCH block (e.g., O), e.g., O+O_SSB.

In such example, the configured frequency domain offset (e.g., O_SSB) is an extra offset to the offset acquired from the MIB of the detected SS/PBCH block (e.g., O).

In one instance, it can be combined with the mentioned examples and/or instances in this disclosure. If the UE is provided with the configuration of the frequency offset (e.g., O_SSB), the UE can determine the second offset consisting the offset from a smallest RB index of the CORESET for Type-PDCCH CSS set to a smallest RB index of the common RB overlapping with a first RB of the detected SS/PBCH block as the configured frequency domain offset (e.g., O_SSB); otherwise, the UE can determine the second offset consisting the offset from a smallest RB index of the CORESET for Type0-PDCCH CSS set to a smallest RB index of the common RB overlapping with a first RB of the detected SS/PBCH block as the one calculated by the UE according to the mentioned example, embodiment, and/or instances in the present disclosure. One example of the UE procedure for this aspect of this example is shown in FIG. 15B.

Figure 15B:
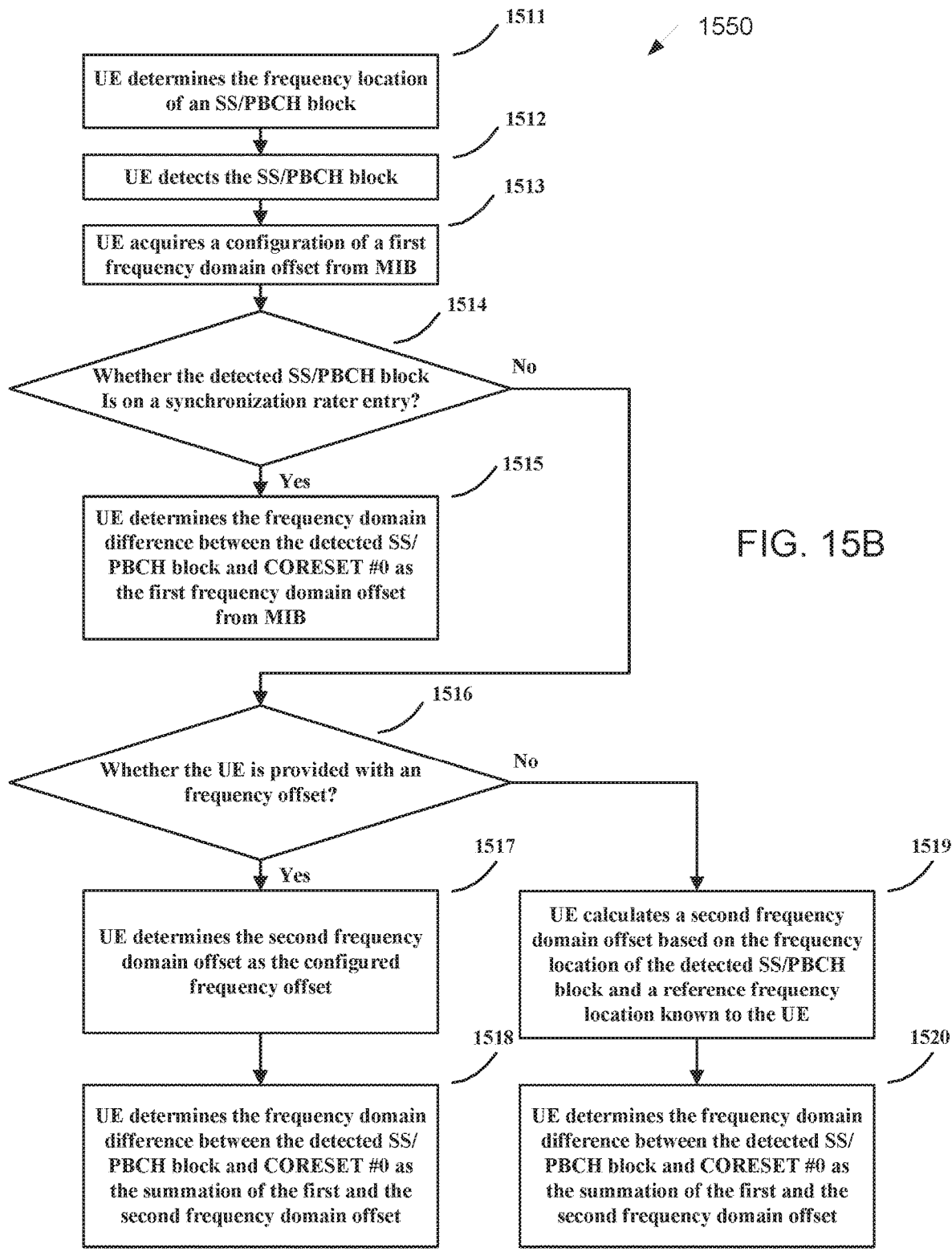
FIG. 15B illustrates another flow chart of a UE procedure for determining the frequency location of CORESET #0 according to embodiments of the present disclosure.

FIG. 15B illustrates another flow chart of a UE procedure 1550 for determining the frequency location of CORESET #0 according to embodiments of the present disclosure. An embodiment of the UE procedure 1550 shown in FIG. 15B is for illustration only. One or more of the components illustrated in FIG. 15B can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15B, the UE procedure 1550 begins at step 1511. In step 1511, the UE determines the frequency location of an SS/PBCH block. In step 1512, the UE detects the SS/PBCH block. In step 1513, the UE acquires a configuration of a first frequency domain offset from MIB. In step 1514, the UE determines whether the detected SS/PBCH block is on a synchronization rater entry. In step 1514, if the UE determines that the detected SS/PBCH block is on a synchronization rater entry, the UE procedure 1550 goes to step 1515. In step 1514, if the UE does not determine, the UE procedure 1550 goes to step 1516. In step 1515, the UE determines the frequency domain difference between the detected SS/PBCH block and CORESET #0 as the first frequency domain offset from MIB. In step 1516, the UE determines whether the UE is provided with a frequency offset. In step 1516, if the UE determines that the UE is provided with a frequency offset, the UE procedure 1550 goes to step 1517. In step 1516, if the UE does not determine, the UE procedure 1550 goes to step 1519. In step 1517, the UE determines the second frequency domain offset as the configured frequency offset. In step 1518, the UE determines the frequency domain difference between the detected SS/PBCH block and CORESET #0 as the summation of the first and the second frequency domain offset. In step 1519, the UE calculates a second frequency domain offset based on the frequency location of the detected SS/PBCH block and a reference frequency location known to the UE. In step 1520, the UE determines the frequency domain difference between the detected SS/PBCH block and CORESET #0 as the summation of the first and the second frequency domain offset In one example, a UE can determine the offset from a smallest RB index of the CORESET for Type-PDCCH CSS set to a smallest RB index of the common RB overlapping with a first RB of the detected SS/PBCH block based on whether the detected SS/PBCH block is located on the synchronization raster entry (or within a range from the synchronization raster entry).

In one instance, if a UE determines the detected SS/PBCH block is located on the synchronization raster entry (or within a range from the synchronization raster entry), the UE determines the offset from a smallest RB index of the CORESET for Type0-PDCCH CSS set to a smallest RB index of the common RB overlapping with a first RB of the detected SS/PBCH block according to the first frequency offset as configured by the MIB of the detected SS/PBCH block, and if a UE determines the detected SS/PBCH block is not located on the synchronization raster entry (or outside a range from the synchronization raster entry), the UE determines the offset from a smallest RB index of the CORESET for Type0-PDCCH CSS set to a smallest RB index of the common RB overlapping with a first RB of the detected SS/PBCH block as a second frequency domain offset.

Figure 16:
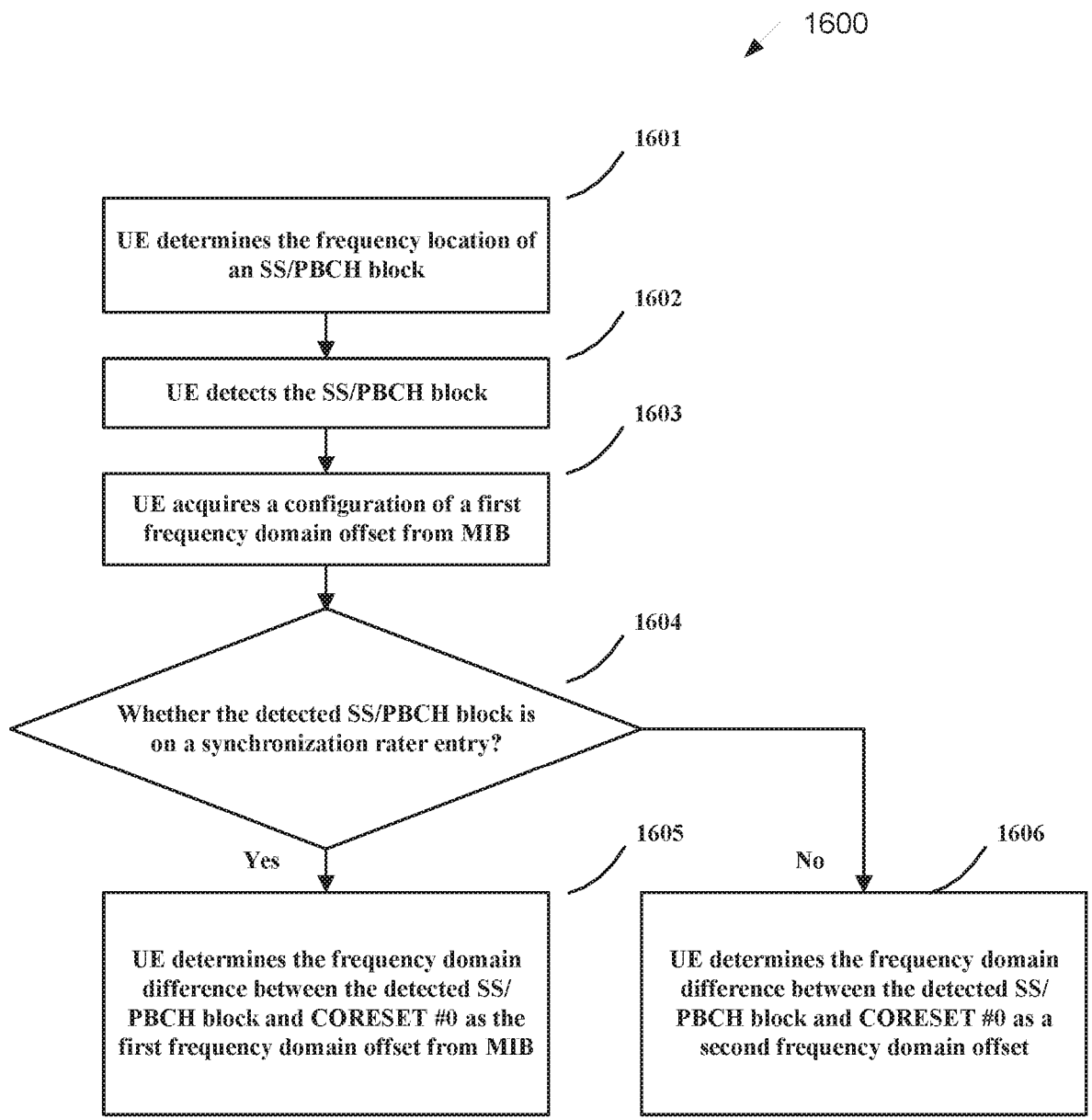
FIG. 16 illustrates a flow chart of a UE procedure for determining the frequency location of CORESET #0 according to embodiments of the present disclosure.

FIG. 16 illustrates a flow chart of a UE procedure 1600 for determining the frequency location of CORESET #0 according to embodiments of the present disclosure. An embodiment of the UE procedure 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, the UE procedure 1600 begins at step 1601. In step 1601, the UE determines the frequency location of an SS/PBCH block. In step 1602, the UE detects the SS/PBCH block. In step 1603, the UE acquires a configuration of a first frequency domain offset from MIB. In step 1604, the UE determines whether the detected SS/PBCH block is on a synchronization rater entry. In step 1604, if the UE determines that the detected SS/PBCH block is on a synchronization rater entry, the UE procedure 1600 goes to step 1605. In step 1604, if the UE does not determine, the UE procedure 1600 goes to step 1606. In step 1605, the UE determines the frequency domain difference between the detected SS/PBCH block and CORESET #0 as the first frequency domain offset from MIB. In step 1606, the UE determines the frequency domain difference between the detected SS/PBCH block and CORESET #0 as a second frequency domain offset In one example, the second frequency domain offset can be a fixed value, e.g., fixed per SCS of SS/PBCH block.

In one sub-example, the second frequency domain offset can be 28 RBs for SCS of SS/PBCH block as 30 kHz.

In another sub-example, the second frequency domain offset can be 76 RBs for SCS of SS/PBCH block as 15 kHz.

In one example, the second frequency domain offset can be having a one-to-one mapping with the first frequency domain offset (e.g., first frequency offset denoted as O).

In one sub-example, the second frequency domain offset can be O+X, where X is a fixed value, e.g., fixed per SCS of SS/PBCH block. E.g., X=1 for all SCS of SS/PBCH blocks, or X=4 for all SCS of SS/PBCH blocks, or X=14 for SCS of SS/PBCH block as 30 kHz, or X=38 for SCS of SS/PBCH block as 15 kHz.

In another sub-example, the second frequency domain offset can be X−O, where X is a fixed value, e.g., fixed per SCS of SS/PBCH block. E.g., X=28 for SCS of SS/PBCH block as 30 kHz, X=76 for SCS of SS/PBCH block as 15 kHz.

In one example, the second frequency domain offset is determined from a separate configuration table, which is designed differently from the configuration table for SS/PBCH blocks located on a synchronization raster entry. For instance, the first frequency domain offset is determined based on a first configuration table, and the second frequency domain offset is determined based on a second configuration table.

In one example, the second frequency domain offset is configured by the gNB, e.g., associated with the configured frequency location of the detected SS/PBCH block.

Figure 17:
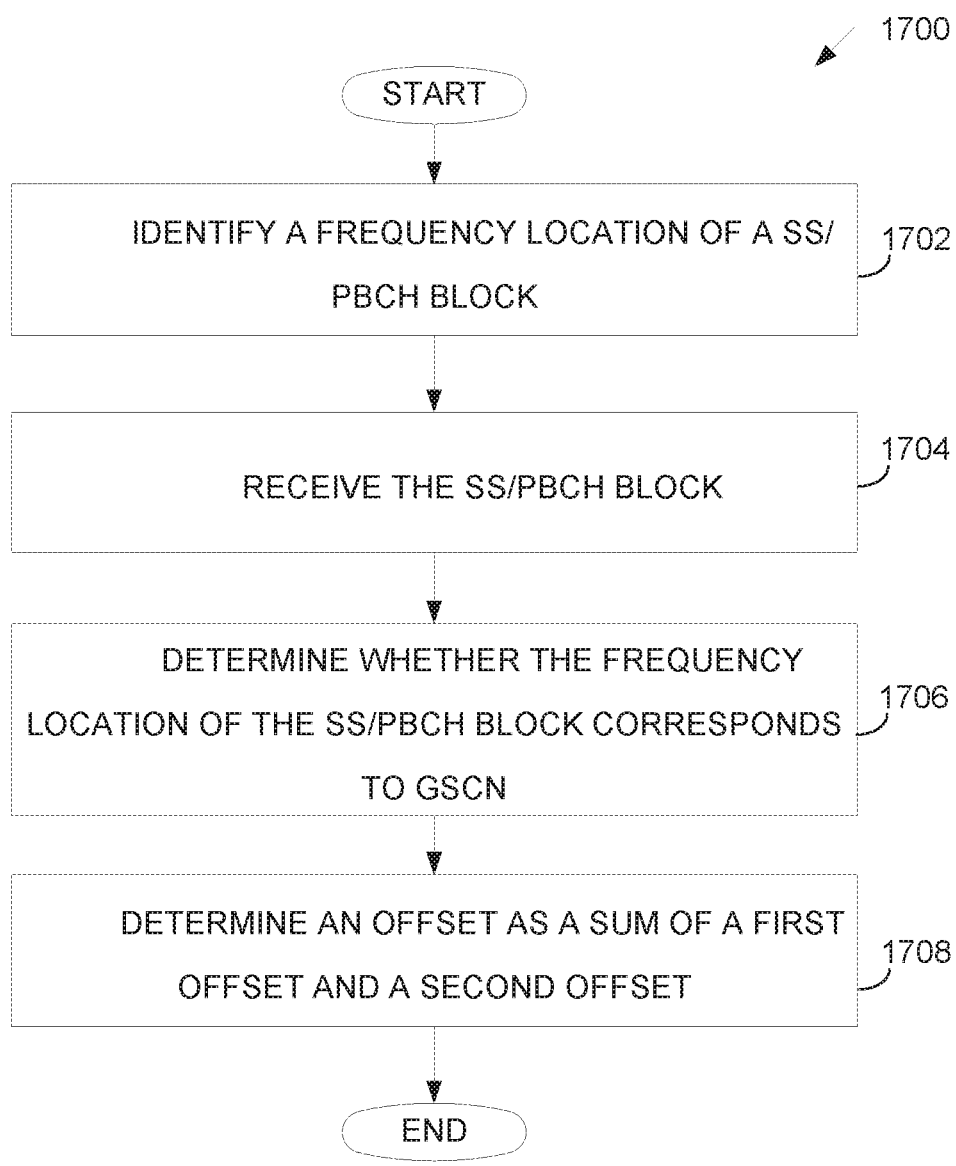
FIG. 17 illustrates a flow chart of a method for RMSI reception according to embodiments of the present disclosure.

FIG. 17 illustrates a flow chart of a method 1700 for RMSI reception according to embodiments of the present disclosure, as may be performed by a user equipment (UE) (e.g., 111-116 as illustrated in FIG. 1). An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 17, the method 1700 begins at step 1702. In step 1702, the UE supporting a shared spectrum channel access identifies a frequency location of a synchronization signals and physical broadcast channel (SS/PBCH) block.

Subsequently, the UE in step 1704 receives, from a base station (BS), the SS/PBCH block.

Next, the UE in step 1706 determines whether the frequency location of the SS/PBCH block corresponds to a global synchronization channel number (GSCN) of a synchronization raster entry.

Finally, the UE in step 1708 determines an offset as a sum of a first offset and a second offset if the frequency location of the SS/PBCH block does not correspond to the GSCN of the synchronization raster entry.

In one embodiment, in step 1708, the offset is a difference from a smallest resource block (RB) index of a control resource set (CORESET) for Type physical downlink control channel (Type-PDCCH) common search space (CSS) set to a smallest RB index of a common RB overlapping with a first RB of the SS/PBCH block.

In one embodiment, in step 1708, the first offset, the second offset, and the SS/PBCH block hypothetically located at the GSCN of the synchronization raster entry are identified based on a subcarrier spacing of the CORESET for Type0-PDCCH CSS set.

In one embodiment, the UE identifies the offset as the first offset if the frequency location of the SS/PBCH block corresponds to the GSCN of the synchronization raster entry.

In one embodiment, the UE receives, from the BS via a higher layer signal, the higher layer parameter of ssbFrequency including the frequency location of the SS/PBCH block, if the frequency location of the SS/PBCH block does not correspond to the GSCN of the synchronization raster entry.

In one embodiment, the UE receives, from the BS, the first offset via a field of controlResourceSetZero included in a master information block (MIB) of the SS/PBCH block.

In one embodiment, the UE identifies the second offset that is determined as an offset from a smallest RB index of the common RB overlapping with the first RB of the SS/PBCH block to a smallest RB index of the common RB overlapping with the first RB of a SS/PBCH block hypothetically located at the GSCN of the synchronization raster entry In such embodiment, the synchronization raster entry is determined as a single entry within a bandwidth for a shared spectrum channel access operation and the bandwidth includes the received SS/PBCH block.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:
   detecting a synchronization signal and physical broadcast channel (SS/PBCH) block;
   in case that the SS/PBCH block is not located on a frequency location of a synchronization raster entry, identifying an offset from a smallest resource block (RB) index of control resource set (CORESET) for a Type0-PDCCH to a smallest RB index of a common RB overlapping with a first RB of the SS/PBCH block based on a sum of a first offset and a second offset; and
   monitoring the Type0-PDCCH based on the identified offset,
   wherein the first offset is configured based on a master information block (MIB) in the SS/PBCH block, and
   wherein the second offset is identified based on an offset from the smallest RB index of the common RB overlapping with the first RB of the SS/PBCH block to a smallest RB index of a common RB overlapping with a first RB of another SS/PBCH block hypothetically located on the frequency location of the synchronization raster entry.

2. The method of claim 1, further comprising:
   identifying the offset as the first offset in case that the SS/PBCH block is located on the frequency location of the synchronization raster entry.

3. The method of claim 1, wherein the synchronization raster entry is located in the same carrier as the SS/PBCH block.

4. The method of claim 1, wherein the frequency location of the synchronization raster entry corresponds to a global synchronization channel number (GSCN) of the synchronization raster entry.

5. The method of claim 1, further comprising:
   receiving, from a base station, a high layer parameter ssbFrequency comprising a frequency location of the SS/PBCH block.

6. The method of claim 1, wherein the first offset and the second offset are defined with respect to subcarrier spacing (SCS) of the CORESET for the Type0-PDCCH.

7. A user equipment (UE) in a wireless communication system, the UE comprising:
a transceiver; and
at least one processor operably connected to the transceiver and configured to:
detect a synchronization signal and physical broadcast channel (SS/PBCH) block,
in case that the SS/PBCH block is not located on a frequency location of a synchronization raster entry, identify an offset from a smallest resource block (RB) index of control resource set (CORESET) for a Type0-PDCCH to a smallest RB index of a common RB overlapping with a first RB of the SS/PBCH block based on a sum of a first offset and a second offset, and
monitor the Type0-PDCCH based on the identified offset,
wherein the first offset is configured based on a master information block (MIB) in the SS/PBCH block, and
wherein the second offset is identified based on an offset from the smallest RB index of the common RB overlapping with the first RB of the SS/PBCH block to a smallest RB index of a common RB overlapping with a first RB of another SS/PBCH block hypothetically located on the frequency location of the synchronization raster entry.

8. The UE of claim 7, wherein the at least one processor is further configured to identify the offset as the first offset in case that the SS/PBCH block is located on the frequency location of the synchronization raster entry.

9. The UE of claim 7, wherein the synchronization raster entry is located in the same carrier as the SS/PBCH block.

10. The UE of claim 7, wherein the frequency location of the synchronization raster entry corresponds to a global synchronization channel number (GSCN) of the synchronization raster entry.

11. The UE of claim 7, wherein the at least one processor is further configured to receive, from a base station via the transceiver, a high layer parameter ssbFrequency comprising a frequency location of the SS/PBCH block.

12. The UE of claim 7, wherein the first offset and the second offset are defined with respect to subcarrier spacing (SCS) of the CORESET for the Type0-PDCCH.

13. A base station (BS) in a wireless communication system, the BS comprising:
a transceiver; and
at least one processor operably connected to the transceiver and configured to configure an offset identified from a smallest resource block (RB) index of control resource set (CORESET) for a Type0-PDCCH to a smallest RB index of a common RB overlapping with a first RB of a synchronization signal and physical broadcast channel (SS/PBCH) block based on a sum of a first offset and a second offset in case that is not located on a frequency location of a synchronization raster entry,
wherein the Type0-PDCCH is monitored based on the identified offset,
wherein the first offset is configured based on a master information block (MIB) in the SS/PBCH block, and
wherein the second offset is identified based on an offset from the smallest RB index of the common RB overlapping with the first RB of the SS/PBCH block to a smallest RB index of a common RB overlapping with a first RB of another SS/PBCH block hypothetically located on the frequency location of the synchronization raster entry.

14. The BS of claim 13, wherein the offset is identified as the first offset in case that the SS/PBCH block is located on the frequency location of the synchronization raster entry.

15. The BS of claim 13, wherein the synchronization raster entry is located in the same carrier as the SS/PBCH block.

16. The BS of claim 13, wherein the frequency location of the synchronization raster entry corresponds to a global synchronization channel number (GSCN) of the synchronization raster entry.

17. The BS of claim 13, wherein the transceiver is configured to transmit, to a user equipment (UE), a high layer parameter ssbFrequency comprising a frequency location of the SS/PBCH block.

18. The BS of claim 13, wherein the first offset and the second offset are defined with respect to subcarrier spacing (SCS) of the CORESET for the Type0-PDCCH.

* * * * *